US010491619B2

(12) United States Patent
Yampolskiy et al.

(10) Patent No.: US 10,491,619 B2
(45) Date of Patent: *Nov. 26, 2019

(54) ONLINE PORTAL FOR IMPROVING CYBERSECURITY RISK SCORES

(71) Applicant: Security Scorecard, Inc., New York, NY (US)

(72) Inventors: Aleksandr Yampolskiy, New York, NY (US); Rob Blackin, East Brunswick, NJ (US); Alexander Heid, Hollywood, FL (US); Samuel Kassoumeh, New York, NY (US)

(73) Assignee: SecurityScorecard, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,168

(22) Filed: Mar. 16, 2016

(65) Prior Publication Data

US 2016/0248797 A1    Aug. 25, 2016

Related U.S. Application Data

(63) Continuation of application No. 14/702,664, filed on May 1, 2015, now Pat. No. 9,294,498.
(Continued)

(51) Int. Cl.
*H04L 29/06* (2006.01)
*G06F 21/57* (2013.01)
(Continued)

(52) U.S. Cl.
CPC .......... *H04L 63/1433* (2013.01); *G06F 21/56* (2013.01); *G06F 21/57* (2013.01); *G06F 21/577* (2013.01); *G06N 20/00* (2019.01); *G06Q 10/0635* (2013.01); *G06Q 10/06393* (2013.01); *H04L 29/12066* (2013.01);
(Continued)

(58) Field of Classification Search
None
See application file for complete search history.

(56) References Cited

U.S. PATENT DOCUMENTS 7,178,166 B1   2/2007 Taylor et al.
7,237,264 B1   6/2007 Graham et al.
(Continued)

*Primary Examiner* — William J. Goodchild
(74) *Attorney, Agent, or Firm* — Norton Rose Fulbright US LLP

(57) ABSTRACT

Determining an entity's cybersecurity risk and benchmarking that risk includes non-intrusively collecting one or more types of data associated with an entity. Embodiments further include calculating a security score for at least one of the one or more types of data based, at least in part, on processing of security information extracted from the at least one type of data, wherein the security information is indicative of a level of cybersecurity. Some embodiments also comprise assigning a weight to the calculated security score based on a correlation between the extracted security information and an overall security risk determined from analysis of one or more previously-breached entities in the same industry as the entity. Additional embodiments include calculating an overall cybersecurity risk score for the entity based, at least in part, on the calculated security score and the weight assigned to the calculated security score.

16 Claims, 11 Drawing Sheets

Related U.S. Application Data

(60) Provisional application No. 62/091,477, filed on Dec. 13, 2014, provisional application No. 62/091,478, filed on Dec. 13, 2014.

(51) Int. Cl.
<table>
<tr><td>H04L 29/08</td><td>(2006.01)</td></tr>
<tr><td>H04L 29/12</td><td>(2006.01)</td></tr>
<tr><td>G06N 20/00</td><td>(2019.01)</td></tr>
<tr><td>H04L 12/26</td><td>(2006.01)</td></tr>
<tr><td>G06Q 10/06</td><td>(2012.01)</td></tr>
<tr><td>G06F 21/56</td><td>(2013.01)</td></tr>
<tr><td>H04W 84/12</td><td>(2009.01)</td></tr>
</table>

(52) U.S. Cl.
CPC ........ *H04L 43/065* (2013.01); *H04L 61/1511* (2013.01); *H04L 61/2007* (2013.01); *H04L 61/2076* (2013.01); *H04L 61/25* (2013.01); *H04L 61/2503* (2013.01); *H04L 63/08* (2013.01); *H04L 63/1425* (2013.01); *H04L 63/1458* (2013.01); *H04L 67/10* (2013.01); *H04W 84/12* (2013.01); *G06F 2221/034* (2013.01)

(56) References Cited

U.S. PATENT DOCUMENTS

| | | | |
|---|---|---|---|
| 7,574,740 B1 | 8/2009 | Kennis | |
| 7,634,800 B2 | 12/2009 | Ide et al. | |
| 7,913,303 B1 | 3/2011 | Rouland et al. | |
| 7,934,254 B2 | 4/2011 | Graham | |
| 9,294,498 B1* | 3/2016 | Yampolskiy | H04L 63/1433 |
| 2002/0147676 A1* | 10/2002 | Karmali | G06Q 40/00 705/38 |
| 2003/0037063 A1* | 2/2003 | Schwartz | G06Q 40/08 |
| 2006/0270011 A1* | 11/2006 | Andersson | C12N 9/0006 435/139 |
| 2006/0272011 A1* | 11/2006 | Ide | G06F 21/31 726/5 |
| 2010/0031358 A1* | 2/2010 | Elovici | H04L 41/147 726/24 |
| 2011/0265162 A1* | 10/2011 | Alavandar | G06Q 99/00 726/7 |
| 2013/0203023 A1* | 8/2013 | Sadeh-Koniecpol | G09B 5/00 434/118 |
| 2014/0098955 A1 | 4/2014 | Hughes et al. | |
| 2014/0189860 A1 | 7/2014 | Hull Roskos | |
| 2014/0199663 A1 | 7/2014 | Sadeh-Koniecpol et al. | |
| 2014/0199664 A1 | 7/2014 | Sadeh-Koniecpol et al. | |
| 2014/0344008 A1* | 11/2014 | Gammage | G06Q 10/0637 705/7.28 |
| 2015/0073981 A1* | 3/2015 | Adjaoute | G06Q 30/0225 705/39 |
| 2015/0074579 A1 | 3/2015 | Gladstone et al. | |

\* cited by examiner

Security Scorecard

Detailed Report Prepared for
ACME, Inc.

Report Generated on
October 27, 2014 03:43 PM (EST)

Scorecard Overview ⟵ 700

A ACME, Inc.
ScoreCard ⟵ 702
66th Percentile
Retail Industry  anyurl12345.com
(http://www.anyurl12345.com)

| | |
|---|---|
| Quantity of IPs Discovered | 178843 |
| E-mail Addresses Detected | 1043 |
| Malware Events Detected | 228 |

THREAT INDICATORS ⟵ 704
- (A) Application Security
- (D) IP Reputation
- (A) Cubit Score
- (D) Network Security
- (A) DNS Health
- (A) Endpoint Security INFORMATIONAL INDICATORS ⟵ 706
- (A) Patching Cadence
- (D) Social Engineering
- (F) Password Exposure
- (B) Hacker Sites

OVERALL RATING HISTORY ⟵ 708

The chart below shows the evolution of the company's relative security ranking over time. The shaded area represents the range of values taken by companies in the Software industry.

— anyurl12345.com
☐ Retail Industry Ratings (Chart: PERCENTILE axis 0–100, dates Sep 28, Oct 05, Oct 12, Oct 19, Oct 28)

FINDINGS SUMMARY ⟵ 710

| ISSUE DETECTED | Class |
|---|---|
| 17 Insecure Open Port(s) Indentified: This can Increase Risk Of Authentication Bypass Attacks. | Network Security |
| Network Security Profile: The Network Security Profile Score is Below Industry Average. It Is Worse Than 72% Of Industry | Network Security |

FIG. 7

NETWORK SECURITY — 1102

Checks public datasets for evidence of high risk or insecure open ports within company network. Insecure ports can often be exploited to allow an attacker to circumvent the login process or obtain elevated access to the system. If misconfigured, an open port can act as the entry point between a hacker's workstation and your internal network.

17 Insecure Open Port(s) Identified: This can increase risk of authentication bypass attacks.

Several insecure and/or suspicious open ports have been detected as being publicly accessible. The availability of these ports allow attackers to engage in authentication bypass attacks (brute forcing attempts, remote buffer overflows, blank passwords). An attacker can leverage this access to pivot access into further enterprise resources:

20-FTP

| IP | FIRST DISCOVERED | HOST |
|---|---|---|
| 192.168.1.17 | 26-AUG-2014 | |

1104

HACKER SITES

Monitoring underground hacker websites for chatter or discussion about your company. Hackers will brag about vulnerabilities discovered in your system in order to gain credibility within the hacker community. Once published, any user browsing the hacker forum can discover and exploit your vulnerabilities.

Older discussions may have been addressed or are no longer relevant are penalized less than more recent discussions.

anyurl12345.com has been mentioned on hacked news 1 time(s) in the last 2 year(s)

- Company: The ACME, Inc.
  Root cause: Inside Job
  Description: Three ACME, Inc. employees were arrested for allegedly stealing personal information of some 300 employees, and were initially detected last fall and those employees whose files were notified of breach. One of the three employees was caught using her ACME, Inc. email to send the stolen information. Security investigators fear that this breach may have affected as many as 20,000 individuals. Information stolen included Social Security numbers and birthdates. Allegedly the employees opened numerous fraudulent accounts with the stolen personal information.
  Date: 06-Feb-2014      1106

DNS HEALTH

Detecting DNS insecure configurations and vulnerabilities.

SPF Record
SPF record [passed] validation, Spoofing, or imitating emails belonging to anyurl12345.com. prohibited.

DNS HISTORY
A passive DNS history scan revealed 0 suspicious domain(s) associated with homedepot.com IPs.
No issues found.

FIG. 11

ONLINE PORTAL FOR IMPROVING CYBERSECURITY RISK SCORES

CROSS-REFERENCE TO RELATED APPLICATIONS

This application is a continuation of U.S. patent application Ser. No. 14/702,664 entitled "ONLINE PORTAL FOR IMPROVING CYBERSECURITY RISK SCORES," filed May 1, 2015, which claims priority to U.S. Provisional Patent Application No. 62/091,477 entitled "CORPORATE IP ADDRESS DISCOVERY THROUGH SUBSIDIARY AND INTERNAL SYSTEM MAPPING SYSTEM AND METHOD," filed Dec. 13, 2014, and also claims priority to U.S. Provisional Patent Application No. 62/091,478 entitled "CORPORATE CYBER SECURITY BENCHMARKING AS A SERVICE SYSTEM AND METHOD," filed Dec. 13, 2014. The entire contents of these applications are incorporated herein by reference in their entirety.

FIELD OF THE DISCLOSURE

This disclosure generally relates to corporate cybersecurity technology. More specifically, this disclosure relates to calculating an entity's cybersecurity risk and benchmarking the calculated risk.

BACKGROUND

Security risks to a corporation have become increasingly complex. Many threats to corporate information security, including those attributable to terrorism, organized crime, and/or individual hackers can be asymmetric, distributed, and/or networked, making cybersecurity risks more difficult to manage. Further, corporations are beginning to appreciate the interdependence between a corporate risk portfolio and the way it does business. For example, corporations understand that certain types of behavior may enhance or undermine a corporation's license to operate in addition to increasing or reducing the corporation's cybersecurity risks. As a result, corporate cybersecurity is receiving more attention today than it did in the past.

SUMMARY

A corporate entity may assess its cybersecurity risk by calculating and/or tracking its own cybersecurity performance, as well the cybersecurity performance of its competitors and current and potential business partners. Based on the assessment, the entity can make meaningful decisions to improve its cybersecurity performance. To improve its market standing, the entity can benchmark its cybersecurity performance against similar corporate entities, such as competitors, to make sure it's cybersecurity performance is not below an industry standard (written or unwritten). In doing so, the entity can reduce the likelihood of experiencing a security breach, and likewise, suffering from client loss, reputation loss, and exposure to liability.

According to one embodiment, a method for determining an entity's cybersecurity risk includes non-intrusively collecting, by a processor, one or more types of data associated with an entity. The method can also comprises calculating, by the processor, a security score for at least one of the one or more types of data based, at least in part, on processing of security information extracted from the at least one type of data, wherein the security information is indicative of a level of cybersecurity. The method may further include assigning, by the processor, a weight to the calculated security score based on a correlation between the extracted security information and an overall cybersecurity risk determined from analysis of one or more previously-breached entities in the same industry as the entity. The method can also comprise calculating, by the processor, an overall cybersecurity risk score for the entity based, at least in part, on the calculated security score and the weight assigned to the calculated security score.

According to another embodiment, a computer program product includes non-transitory computer-readable medium comprising instructions which, when executed by a processor of a computing system, cause the processor to perform the step of non-intrusively collecting one or more types of data associated with an entity. The medium can also comprises instructions which cause the processor to perform the step of calculating a security score for at least one of the one or more types of data based, at least in part, on processing of security information extracted from the at least one type of data, wherein the security information is indicative of a level of cybersecurity. The medium may further include instructions which cause the processor to perform the step of assigning a weight to the calculated security score based on a correlation between the extracted security information and an overall cybersecurity risk determined from analysis of one or more previously-breached entities in the same industry as the entity. The medium can also comprises instructions which cause the processor to perform the step of calculating an overall cybersecurity risk score for the entity based, at least in part, on the calculated security score and the weight assigned to the calculated security score.

According to yet another embodiment, an apparatus includes a memory and a processor coupled to the memory. The processor can be configured to execute the step of non-intrusively collecting one or more types of data associated with an entity. The processor can also be configured to execute the step of calculating a security score for at least one of the one or more types of data based, at least in part, on processing of security information extracted from the at least one type of data, wherein the security information is indicative of a level of cybersecurity. The processor can be further configured to execute the step of assigning a weight to the calculated security score based on a correlation between the extracted security information and an overall cybersecurity risk determined from analysis of one or more previously-breached entities in the same industry as the entity. The processor can also be configured to execute the step of calculating an overall cybersecurity risk score for the entity based, at least in part, on the calculated security score and the weight assigned to the calculated security score.

The foregoing has outlined rather broadly the features and technical advantages of the present invention in order that the detailed description of the invention that follows can be better understood. Additional features and advantages of the invention will be described hereinafter that form the subject of the claims of the invention. It should be appreciated by those skilled in the art that the concepts and specific embodiments disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosure, reference is made to the following FIGURES taken in conjunction with their accompanying descriptions:

FIGS. 7-11 illustrate respective outputs displayed by a scorecard system according to an embodiment.

DETAILED DESCRIPTION

Figure 1:
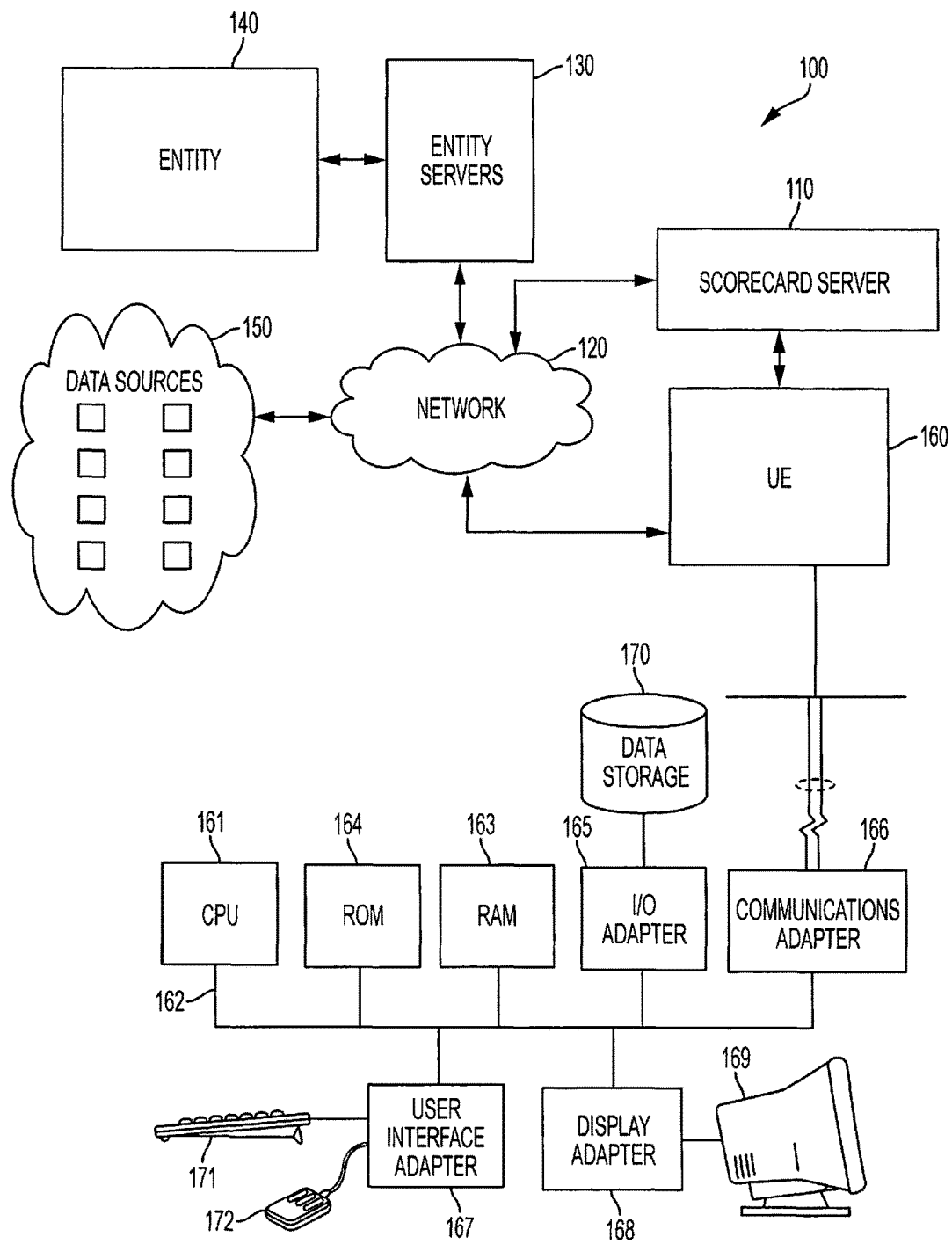
FIG. 1 is a block diagram of a network that includes a scorecard server, data sources, and an entity with a cybersecurity risk according to an embodiment.

An entity's knowledge of its cybersecurity risks, as well as those of its current and potential business partners and competitors, may serve as strategic information used to guide cybersecurity and business decisions. To provide an accurate picture of an entity's cybersecurity risk, the concepts described herein involve identifying and collecting both "non-intrusive" and "intrusive" data associated with an entity for which cybersecurity risk is calculated. Non-intrusive data collection involves collecting data from a source for which permission from the entity whose cybersecurity risk is calculated is not required. In contrast, intrusive data collection involves collecting data from a source for which permission from the entity whose cybersecurity risk is calculated is required. Non-intrusive data collection can be employed when an entity desires a high-level, or general assessment of its cybersecurity risk, while intrusive data collection can be employed when an entity requires a low-level, or more detailed assessment of its cybersecurity risk. Nevertheless, these data collection techniques can be used in conjunction with, or alternatively to, one another to provide a requisite level of performance—depending on the objective.

The collected data is "contextualized" so that it can be meaningfully interpreted to accurately score the entity's cybersecurity risk. To provide context, the collected data indicative of cybersecurity risk is processed using extraction, parsing, and/or other processing methods described herein. The contextualized data is then used to calculate a cybersecurity risk score, which itself can be mathematically refined, i.e., normalized and/or weighted, depending on multiple factors, such as the size of the entity, the relationship between the collected data and overall cybersecurity risk, and the type of data collected.

A scorecard system can be used to benchmark the calculated cybersecurity risk score. The scorecard system can use the calculated cybersecurity risk score to determine ranking, percentile, and other detailed cybersecurity risk information about the entity compare various cybersecurity risk metrics relating to the entity to those of its competitors, current and prospective business partners, and the like. An entity may use such benchmark information to manage its cybersecurity posture and to guide business operations.

As will be further discussed, the inventive concepts allow the cybersecurity risk score for an entity to be updated via real-time monitoring. Also, the scorecard system allows the cybersecurity risk score to be determined nearly instantly, or in near real-time. As a result, an entity can use the scorecard system to track its historical performance and be proactive in preventing a cybersecurity threat. It can be seen that an entity can use the scorecard system to reduce audit times by saving time on manual cybersecurity audits and by getting near-instant results.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module comprises a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram of network 100 that includes a scorecard server 110, a communication network 120, an entity server 130, an entity 140, data sources 150, and user station 160. The scorecard server 110 includes one or more servers that, according to one embodiment, are configured to perform several of the functions described herein. One or more of the servers comprising the scorecard server 110 include memory, storage hardware, software residing thereon, and one or more processors configured to perform functions associated with network 100. For example, components comprising user station 160, such as CPU 162, can be used to interface and/or implement scorecard server 110. Accordingly, user station 160 may serve as a cybersecurity risk assessment portal by which a user may access a scorecard system disclosed herein. The portal can function to allow multiple users, inside and outside system 100 (e.g., at multiple instances of user station 160), to interface with one another. One of skill in the art will readily recognize that different server and computer architectures can be utilized to implement scorecard server 110 and that scorecard server 110 is not limited to a particular architecture so long as the hardware implementing scorecard server 110 supports the functions of the scorecard system disclosed herein.

The communication network 120 facilitates communications of data between the scorecard server 110 and the data sources 150. The communication network 120 can also facilitate communications of data between the scorecard server 110 and other servers/processors, such as entity server 130. The communication network 120 includes any type of communications network, such as a direct PC-to-PC connection, a local area network (LAN), a wide area network (WAN), a modem-to-modem connection, the Internet, a combination of the above, or any other communications network now known or later developed within the networking arts which permits two or more computers to communicate.

The entity server 130 includes the servers which the entity 140 uses to support its operations and which the scorecard server 110 accesses to collect further information to calculate and benchmark an entity's cybersecurity risk. The data sources 150 include the sources from which the scorecard server 110 collects information to calculate and benchmark an entity's cybersecurity risk.

The Entity 140 includes any organization, company, corporation, or group of individuals. For example, and not limitation, one entity may be a corporation with thousands of employees and headquarters in New York City, while another entity may be a group of one or more individuals associated with a website and having headquarters in a residential home.

Data Sources 150 includes any source of data accessible over Network 120. For example, and not limitation, one source of data can include a website associated with a company, while another source of data may be an online database of various information. In general, the data sources 150 may be sources of any kind of data, such as domain name data, social media data, multimedia data, IP address data, and the like. One of skill in the art would readily recognize that data sources 150 are not limited to a particular data source, and that any source from which data may be retrieved may serve as a data source so long as it can be accessed by network 120.

With respect to user station 160, the central processing unit ("CPU") 161 is coupled to the system bus 162. The CPU 161 can be a general purpose CPU or microprocessor performing the functions of the scorecard server 110, a graphics processing unit ("GPU"), and/or microcontroller. Embodiments are not restricted by the architecture of the CPU 161 so long as the CPU 161, whether directly or indirectly, supports the operations described herein. The CPU 161 is one component may execute the various described logical instructions.

The user station 160 also comprises random access memory (RAM) 163, which can be synchronous RAM (SRAM), dynamic RAM (DRAM), synchronous dynamic RAM (SDRAM), or the like. The user station 160 may utilize RAM 163 to store the various data structures used by a software application. The user station 160 also comprises read only memory (ROM) 164 which can be PROM, EPROM, EEPROM, optical storage, or the like. The ROM may store configuration information for booting the user station 160. The RAM 163 and the ROM 164 hold user and system data, and both the RAM 163 and the ROM 164 can be randomly accessed.

The user station 160 also comprises an input/output (I/O) adapter 165, a communications adapter 166, a user interface adapter 167, and a display adapter 168. The I/O adapter 165 and/or the user interface adapter 167 may, in certain embodiments, enable a user to interact with the user station 160. In a further embodiment, the display adapter 168 may display a graphical user interface (GUI) associated with a software or web-based application on a display device 169, such as a monitor or touch screen.

The I/O adapter 165 may couple one or more storage devices 170, such as one or more of a hard drive, a solid state storage device, a flash drive, a compact disc (CD) drive, a floppy disk drive, and a tape drive, to the user station 160. Also, the data storage 170 can be a separate server coupled to the user station 160 through a network connection to the I/O adapter 165. The communications adapter 166 can be adapted to couple the user station 160 to a network, which can be one or more of a LAN, WAN, and/or the Internet. Therefore, in some embodiments, the cybersecurity risk assessment portal 160 may be an online portal. The user interface adapter 167 couples user input devices, such as a keyboard 171, a pointing device 172, and/or a touch screen (not shown) to the user station 160. The display adapter 168 can be driven by the CPU 161 to control the display on the display device 169. Any of the devices 161-168 can be physical and/or logical.

The concepts described herein are not limited to the architecture of user station 160. Rather, the user station 160 is provided as an example of one type of computing device that can be adapted to perform the functions of a server and/or the user interface device 165. For example, any suitable processor-based device can be utilized including, without limitation, personal data assistants (PDAs), tablet computers, smartphones, computer game consoles, and multi-processor servers. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

It should be appreciated that user station 160, or certain components thereof, may reside at, or be installed in, different locations within network 100. According to the illustrated embodiment, user station 160 directly interfaces with scorecard server 110. Such an embodiment is conducive for an individual or user not directly associated with entity 140 to effectuate computation of a cybersecurity risk and/or benchmark of same for that entity. However, in other embodiments, one or more users located at entity 140 or locations directly associated with same, may effectuate computation of a cybersecurity risk and/or benchmark of same for that entity. In such an embodiment, user station 160 (or at least certain components thereof) may directly interface with entity servers 130. Likewise, entity servers 130 may comprise the hardware and/or software found in scorecard server 110 in the illustrated embodiment. Importantly, the features necessary to compute cybersecurity risk scores and benchmarks can be collocated within network 100 or distributed across, e.g., scorecard server 110 and entity servers 130, and user station(s) 160.

Figure 2:
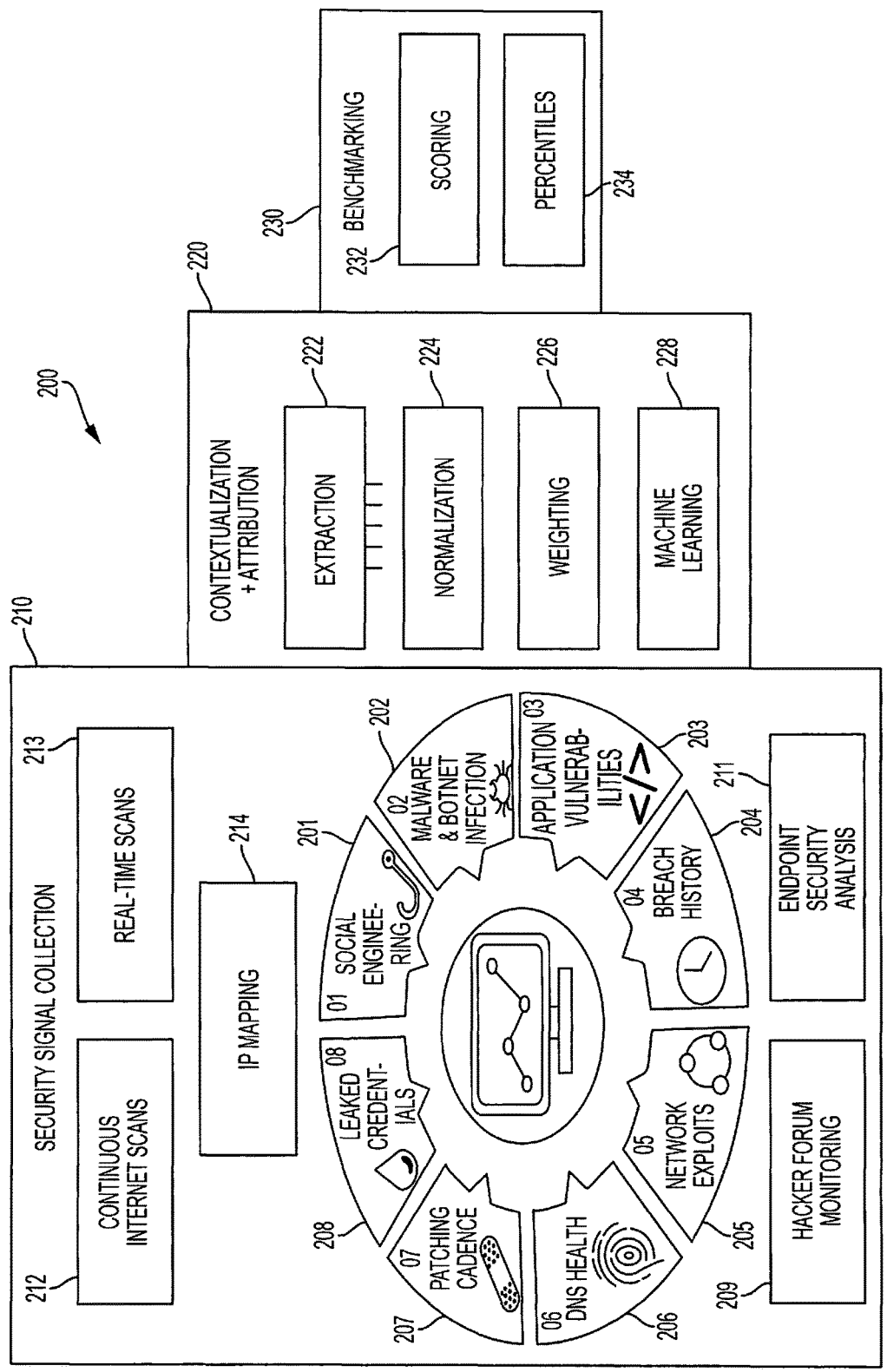
FIG. 2 is a block diagram of a system for calculating and benchmarking an entity's cybersecurity risk according to an embodiment.

FIG. 2 is a block diagram of a system for calculating and benchmarking an entity's cybersecurity risk according to an embodiment. System 200 can be implemented with one or more computing devices, such as scorecard server 110, entity servers 130, and user station(s) 160 illustrated in FIG. 1. System 200 comprises a security signal collection module 210, a contextualization and attribution module 220, and a benchmarking module 230.

Security signal collection module 210 collects one or more types of data that relate to the cybersecurity risks associated with an entity. Security signal collection module 210 comprises submodules that collect different types of data from a predefined "threat sphere." The threat sphere may change depending on the entity for which a cybersecurity risk score is calculated, and may further change according to the goals and/or objectives of the entity. In any event, the threat sphere is typically defined to include sources of information that likely comprise, generate, are responsible for, or otherwise correspond to data indicative of an entity's cybersecurity risk. Accordingly, each module or submodule that collects data corresponds to one more channels or data feeds from sources comprising the threat sphere.

According to the illustrated embodiment, security signal collection module 210 comprises a social engineering collection module 201, a malware and botnet infection collection module 202, an application vulnerabilities collection module 203, a breach history collection module 204, a network exploits collection module 205, a DNS Health collection module 206, a patching cadence collection module 207, and a leaked credentials collection module 208. Security signal collection module 210 can also comprises a hacker forum monitoring module 209 for collecting data from hacker forums can also and an endpoint security analysis module 211 for collecting endpoint data.

Security signal collection module 210 can also comprises modules for specifying when data is collected and how data is associated with an entity. For example, the security signal collection module 210 comprises a continuous Internet scans module 212 for performing continuous scans of Internet data to collect data associated with an entity. The security signal collection module 210 can also comprises a real-time scans collection module 213 for collecting data in real time, such as collecting real-time threat intelligence/data and collecting data in real time from a malicious IP feed, which can include digesting 2000+ bad (IPS) per second. The security signal collection module 210 can also comprises an IP Mapping module 214 to reliably identify IP addresses associated with an entity. By mapping IP addresses to an entity, data collected the Internet over one or more channels comprising the threat sphere (or beyond) can be determined to be associated with, or attributable to, the given entity.

Contextualization and attribution module 220 contextualizes data collected by the security signal collection module 210. The contextualization and attribution module 220 comprises an extraction module 222 to extract data relevant to cybersecurity of a given entity from the collected data. The contextualization and attribution module 220 can also comprises a normalization module 224 and a weighting module 226 to normalize and/or weight a preliminary security score determined based on a raw scoring of the extracted security data. The normalization and/or weighting of a preliminary score may depend on multiple factors, such as, for example, the size of the entity, the relationship between the extracted information and overall cybersecurity performance, and the type of data collected.

The contextualization and attribution module 220 can also comprises a machine learning module 228 to identify and update which factors most significantly affect an entity's cybersecurity. This information can be used to further contextualize the collected data. For example, the security scores identified as being the most relevant may then be normalized and/or weighted to account for their relevancy. The contextualization process can also comprises applying temporal adjustments to security data or calculated security scores based on the time span between an event that generated the security data and the current date. In some embodiments, contextualization can also comprises validating threats, such as, for example, by confirming that an event creating data that indicates the presence of a malware event is in fact a malware event. Further aspects of the contextualization submodules are described in detail below.

Benchmarking module 230 calculates an overall cybersecurity risk score for an entity, as well as a benchmark based on cybersecurity performance metrics. The computed benchmark may further comprise a percentile ranking for the entity. For example, the benchmarking module 230 comprises a scoring module 232 to obtain the overall cybersecurity risk score for an entity based on the contextualization of the entity's security data and processing of scores for each of the different types of security data collected for the entity.

The benchmarking module 230 can also comprises a percentiles module 234 to determine a percentile ranking for the entity which provides an indication of how the entity's cybersecurity fairs with respect to similar companies in the same industry. Further aspects of the benchmarking submodules are described in detail below. A scorecard server, such as scorecard server 100 from FIG. 1, may utilize one or more of the submodules in the security signal collection 210, contextualization 220, and benchmarking 230 modules to score and benchmark an entity's cybersecurity risk.

Computing an entity's cybersecurity risk score and benchmarking that score can be initiated when the scorecard server 110 obtains a uniform resource locator (URL) associated with an entity along with, or as part of, an instruction to calculate and benchmark an entity's cybersecurity risk. For example, a user may access the scorecard system 200 via a user interface that communicates with the scorecard server 100 by entering a URL associated with the entity for which cybersecurity risks are assessed. As another example, the scorecard system 200 can receive, for example, via cybersecurity risk assessment portal 160, a request to calculate an entity's cybersecurity risk and a first set of attributes of the entity. In some embodiments, the first set of attributes may comprise at least an identify of the entity, such as a domain name associated with the entity. In another embodiment, the first set of attributes may also comprise at least the number of employees of the entity, the industry in which the entity operates, and an identification of one or more of the entity's competitors.

In some embodiments, scorecard system 200 can transmit access credentials required to access the cybersecurity risk assessment portal. In such embodiments, receiving, for example via cybersecurity risk assessment portal 160, a request to calculate an entity's cybersecurity risk may be conditioned upon a user providing the access credentials.

In response to receiving an instruction to calculate an entity's cybersecurity risk, the scorecard system 200 identifies access points associated with the entity. Access points correspond to points in a network through which data sources likely to contain data relevant to the entity's cybersecurity may be accessed. In other words, based on the first set of attributes the scorecard system 200 received via the cybersecurity risk assessment portal 160, the scorecard system 200 can identify one or more data sources from which to collect one or more types of data relating to the entity's cybersecurity. For example, the scorecard system 200 may identify e-mail repositories associated with the entity, such as employee e-mail accounts, related portals, and the like, as access points. The scorecard system 200 can also identify Internet Protocol (IP) addresses associated with the entity as access points. To do so, the scorecard system 200 may employ the IP mapping system disclosed in co-owned, patent application No. 14/702,667, filed May 1, 2015, and issued under U.S. Pat. No. 9,641,547 on May 2, 2017, entitled "ENTITY IP MAPPING," the disclosure of which is incorporated herein by reference in its entirety. The scope of access points will generally correspond to the threat sphere defined for the given entity and/or that entity's goals and objectives, and are accessed via channels used by submodules comprising security signal collection module 210.

Aside from identifying the foregoing access points, scorecard system 200 can also identify sources of general or supplemental data, including metadata associated with the entity. These types of general or supplemental data can include information about the industry in which the entity operates, the size of the entity, legal settlement information for the entity, and the technology utilized by the entity. This information is also used to further contextualize the collected data and, ultimately, can be used to refine the entity's security benchmark.

Once the scorecard system 200 identifies access points and sources of general or supplemental data for the entity, security signal collection module 210 collects different types of data associated with the entity from the identified access points and sources. Again, these access points and sources will typically overlap with the threat sphere defined for the entity. The different types of data collected by security signal collection module 210 can be collected non-intrusively, intrusively, or a combination of both. As mentioned, non-intrusive data collection involves collecting data from a data source for which permission from the entity whose cybersecurity risk is assess is not necessary. In contrast, intrusive data collection involves collecting data from a data source for which permission from the entity whose cybersecurity risk is assess is necessary. By way of example collecting data from a data source within an entity's internal network would likely be intrusive.

As noted with respect to security signal collection module 210, one type of data associated with an entity that can be collected includes social engineering information, which can be obtained via social engineering collection module 201. Social engineering information includes any information which may indicate a level of awareness of, or susceptibility to, a social engineering attack, such as a phishing attack. As such, social engineering information can also be collected by reviewing how employees respond to phishing and spam campaigns. Such information can also be collected from vendors that collect spam responses and identify individuals that click on phishing e-mail links.

Also, collecting social engineering information can comprise collecting data that provides an indication of the number of people that work for an entity and the number of security personnel that work for the entity. Collecting social engineering information can also can also comprise collecting information on social media sites provided by disgruntled employees of the entity.

Because social media networks do not typically utilize technology capable of providing the same level of security as other networks, such as a financial institution networks, employees that register on social media networks can be easily discovered by an attacker. In addition, employees on social media networks can be more susceptible to manipulation because of information about the employees that an attacker can obtain from publicly-shared data sources. As a result, attackers may search public data dumps, such as those associated with social media networks, for corporate e-mail addresses combined with insecure or easily-guessable security questions. By collecting social engineering information, it may be determined that several of an entity's employees engage in high risk social media activities. Accordingly, these employees, and likewise the entity, are more at risk.

To determine a level of cybersecurity risk based on social engineering data, the scorecard system 200 may collect information that identifies e-mails associated with the entity that have been used in other cyber-attacks or that are used in social media networks. The scorecard system 200 may attempt to determine the password for an e-mail address by analyzing the password hint provided for the e-mail address on a social network site and/or guessing the password with commonly-used insecure passwords, such as birthdays, mother's name, etc. The results of such attempts may provide further social engineering information indicating the level of security used by employees to secure passwords when they use their corporate e-mails on social networks. If the password is compromised, the scorecard system 200 may attempt to access the corporate network with the same credentials. By attempting to access the corporate network with the same credentials, the scorecard system 200 may obtain further social engineering information, such as information indicating whether employees are using corporate credentials for social networks.

Another type of data that can be collected includes information about leaked credentials, which the scorecard system 200 may collect using leaked credentials collection module 208. Corporate e-mails and associated passwords are often leaked as the result of a previous security breach, theft by a hacker, or a data dump. To collect information indicating the amount of credential information leaked, the scorecard system 200 may search the Internet for employee credentials, such as passwords associated with corporate e-mail addresses that have been compromised. When the scorecard system 200 processes the leaked credentials information, the scorecard system 200 may calculate a score based on how many unique credential sets are found over the last X months. Also the scorecard system 200 can have the score associated with leaked credentials decay over time, because passwords are more likely to be changed over time.

Another type of data associated with an entity that can be collected includes information about malware, spam, and botnet infections, which the scorecard system 200 may collect using malware and botnet infection collection module 202. For example, the scorecard system 200 may monitor the entity's network to detect suspicious activity, such as malware, spam, or botnet events. Based on the monitoring of the entity's network and the detection of a malware, botnet, or spam event, the scorecard system 200 may obtain information that indicates the entity's risk of experiencing a severe security breach as a result of a malware, spam, or botnet infection. Based on the monitoring of the entity's network to detect suspicious activity, the scorecard system 200 may obtain a real-time dataset of IP addresses emanating suspicious activity, such as malware and/or spam, within an entity's network. The real-time dataset of IP addresses includes a list of infected employee workstations, misconfigured and/or hijacked servers, and/or infections of nearby machines in the entity's network.

Another type of data associated with an entity that can be collected includes information about application vulnerabilities, such as common website application vulnerabilities, which the scorecard system may collect using application vulnerabilities collection module 203. Information about application vulnerabilities is critical because, when applications are vulnerable, hackers may manipulate the application into performing unexpected and malicious activities, such as spreading malware, stealing sensitive entity database information, and hijacking user accounts. Information about application vulnerabilities can be collected by performing real-time monitoring of an entity's websites and web applications to detect the presence of common vulnerabilities. For example, according to one embodiment, common vulnerabilities which can be detected includes cross-site scripting (XSS), DOM-based Cross Site Scripting (DOM-XSS), SQL injection (SQLi), Blind SQL Injection (bSQLi), Time based SQL Injection (tSQLi), outdated CMS versions, outdated plugins, forceful browsing, compliance best practices, Remote File Inclusion (RFI), Local File Inclusion (LFI), unsanitized uploads, open directory listings, and the like. According to an embodiment, other information about application vulnerabilities that can be collected via monitoring and detection schemes includes website cookies and HTTP headers security configuration information. However, one of skill in the art would readily recognize that the exact vulnerabilities that are searched for by the scorecard system 200 may vary depending on the technology used by an entity and are not limited to those explicitly disclosed herein.

Another type of data associated with an entity that can be collected includes network exploitation information, which the scorecard system may collect using network exploitation collection module 205. In some embodiments, network exploitation information includes information about the level of security of the entity's network and/or the vulnerabilities in the network's infrastructure. This information is critical because hackers may exploit insecure settings to circumvent the network's login process or obtain elevated access to the system. To collect the information about the level of the security of the entity's network, the scorecard system 200 may search public datasets associated with the entity's network for evidence of high risk network settings which may increase the risk of the network being exploited. The scorecard system 200 can also search and analyze headers of servers from public datasets to collection information about the level of security of the entity's network. The scorecard system can also analyze datasets collected by search engines to identify application security vulnerabilities, for example, by noticing indexed pages or URLs in caches of search browsers that indicate a presence of application security vulnerability. The scorecard system 200 can also extract server version or headers out of cached and indexed pages to determine application or network security. Using network exploitation collection module 205, the scorecard system 200 can also collect information which indicates the number of insecure network settings. The scorecard system 200 can also verify the protocol in use by the network, fingerprint software versions, and compare the versions against a known list of common vulnerabilities and exposures (CVE). Because different insecure network settings may impact network security differently, the scorecard system 200 may assign weights to different insecure network settings based on, for example, a port, protocol, and/or software version in use by the network. For example, having an SQL server port open can be a higher risk than having a mild network configuration.

Another type of data associated with an entity that can be collected includes domain name system (DNS) health information associated with the entity, which the scorecard system 200 may collect using DNS health collection module 206. DNS health information can be information which indicates a level of DNS security based on insecure configurations and vulnerabilities associated with a DNS. The scorecard system 200 may collect such information by searching data points where DNS misconfigurations can cause a cybersecurity risk or can be a sign of a risk of a security breach. The scorecard system 200 may analyze the DNS associated with a domain to determine whether there exist DomainKeys Identified Mail (DKIM), Sender Policy Framework (SPF), or Secure Sockets Layer (SSL) misconfigurations. According to an embodiment, the scorecard system 200 may collect the results of the analysis to serve as part of the DNS health information.

The scorecard system 200 can also collect DNS health information by collecting passive DNS history information which can be used to identify the historical DNS records of an IP address and/or domain name. Passive DNS records may aggregate internal DNS communications between related domain names and IP addresses. The scorecard system 200 may collect the passive DNS history information to identify configurations for SPF, DKIM, and network hosting activity history. The scorecard system 200 may collect recursive DNS settings and flag them to identify DNS servers that are vulnerable to Distributed Reflective Denial of Service (DrDos) attacks.

Another type of data that can be collected includes information about endpoint security, which the scorecard system may collect using endpoint security analysis module 209. Endpoint security information comprises information that specifies the security level of employee workstations and/or mobile devices. Such information can be critical to determining an entity's cybersecurity risk because older, outdated operating systems (OSs) and browsers can be more easily exploited by attackers than recently-released software packages. In some instances, older, outdated operating systems can also have custom tools and scripts designed to take advantage of system flaws to gain access to employee workstations and data. Information associated with endpoint security can be collected by, for example, running advertisements that, when viewed, allow capture of browser and OS information. Such information can be collected from spam campaigns that keep track of individuals that click on website advertisements. Further, such information can be collected by capturing browser and OS information from malware connections.

Endpoint security information specifying the security level of employee workstations and/or mobile devices may also include IP reputation information. In general, IP reputation information specifies the level of suspicious activity occurring within an entity's network by providing a historical profile of activity occurring at a particular IP address. The IP reputation information also provides real-time data of IP addresses emanating suspicious activity within an entity's network. The flagged activity ranges from confirmed malicious activity, such as malware, to out-of-compliance activity that may conflict with corporate best practices, such as peer-to-peer file sharing and the use of anonymized proxy services. For example, a few IP addresses which may be flagged for IP reputation analysis may include: an IP address housing a misconfigured or compromised device; an IP address associated with a misconfigured server; an IP address used to send a spam campaign or host a drive-by-download attack; an IP address used as an anonymized proxy service or as a Tor exit node; an IP address identified as being infected with malware; an IP address identified as using peer-to-peer filing sharing; an IP address identified as hosting a defaced website; and an IP address engaged in web application attacks, network attacks, brute force attacks, and scanning activity. An IP address with a historical profile indicating that the IP address has never participated in malicious activity may be flagged as an IP address with a good IP reputation. In contrast, an IP address that has been identified as participating in malicious activity may be flagged as an IP address with a bad IP reputation. The degree to which each IP address is "good" or "bad" may be determined by the quantity and frequency of the malicious activity associated with the IP address. Accordingly, the IP reputation may be a factor utilized during contextualization, such as when the scorecard system 200 implements the weighing module 226 or the machine learning module 228 to contextualize the data.

The endpoint security analysis module 209 may use clickstream data feeds and/or proprietary URL shortening technologies that identify the originating operating systems, browsers, and browser plugins used by companies to collect endpoint security data. For example, URL shorteners can be released over the Internet and clickdata being generated by the URL shorteners can be logged and analyzed. URL shorteners can also be used in spam campaigns, malware campaigns, and normal baseline traffic. The endpoint security module 209 can also identify known vulnerabilities in a CVE database for outdated software versions and notify a user when outdated software versions are detected. The endpoint security module 209 can also observe and analyze browser and operating systems on incoming sinkhole malware infections to collect the endpoint security data. The endpoint security module 209 can also continuously ingest and analyze internal weblog traffic. The endpoint security module 209 can also analyze sinkholes from phishing domain names to collect endpoint data from individuals in the entity's network who are clicking phishing attacks. In some embodiments, the endpoint security module 209 can also identify and analyze browser plugins through the use of javascript fingerprinting scripts to collect endpoint security data. The endpoint security module may attribute user-agent, OS, and browser plugins to corporate domains based on the IP addresses that are mapped by our IP mapping process. The version information can also be cross-referenced against known vulnerability databases to determine the whether the software is a security threat. Also, if the browser, OS, and plugin are known to have security flaws, then the scorecard system 200 may flag the collected data and assign points to the data which can be summed to obtain a preliminary raw security score for the data.

Another type of data associated with an entity that can be collected includes hacker site information, which the scorecard system 200 may collect using hacker forum monitoring module 207. Hacker forum information can include any information about an entity which has been discussed by hackers in hacker websites and forums. Hackers often brag about vulnerabilities they have discovered in order to gain credibility within the hacker community. Other hackers may then exploit the vulnerabilities to breach an entity's security. Accordingly, the scorecard system 200 may monitor underground hacker websites for chatter or discussion about an entity and collect information associated with an entity to adjust the cybersecurity risk score given to an entity.

The hacker discussions regarding an entity can be collected and contextualized by weighting the discussions according to the severity and immediacy of a potential breach based on the discussions. For example, hackers chatting about a domain, such as CNN.com may not be significant, but when the discussions are in the context of concrete injection strings, the discussions can be an indication that the hackers are planning to target CNN.com soon and with specific attacks.

Another type of data associated with an entity that can be collected includes patching cadence information, which the scorecard system 200 can collect using patching cadence collection module 207. Patching cadence information can be information that indicates the amount of the entity's software that is out-of-date or vulnerable. The scorecard system 200 may collect patching cadence information by searching through an entity's software versions and configurations information and then cross-referencing the identified versions against CVE vulnerability databases. For example, the scorecard system 200 may collect patching cadence information by searching for specific vulnerabilities, such as Poodle, heartbleed, Opensl® and/or other vulnerabilities. When a software version matches a CVE, the software can be flagged. The scorecard system 200 may associate different vulnerabilities with different severities and assign worse scores for the vulnerabilities that present a higher risk to an entity. In some embodiments, the patching cadence module 207 may search for specific vulnerabilities, such as Heartbleed, Shellshock, POODLE, FREAK, and/or other like security vulnerabilities. In some embodiments, patching cadence collection module 207 may collect patching cadence data by marketing data feeds of a technology stack in use at certain companies, by analyzing banner information from identified software versions, by creating an inventory of software used on a website and subdomains, and by analyzing technology help boards and job boards for mentions of companies and their technology stacks. According to another embodiment, some companies may volunteer patching cadence data.

Another type of data associated with an entity that can be collected includes breach history information, which the scorecard system 200 can collect using breach history collection module 204. For example, the scorecard system 200 may collect information about a previous breach experienced by the entity. In some embodiments, the scorecard system 200 may use the breach history information to determine the amount of time the entity takes to cure or diffuse breaches (reaction time). As noted later with respect to contextualization 220, the scorecard system 200 may use the reaction time to calculate a security score for a particular type of security data associated with collected general data associated with an entity.

One or more of the different types of data collected as part of the security signal collection module 210 aspect of scorecard system 200 can be collected from third parties, which may collect the information from across the Internet for any number of companies. For example, in addition to the information collected independently, the scorecard system 200 may collect information, such as, for example, application vulnerability, endpoint security, patching cadence, social engineering, malware, spam, and botnet information from third parties. The scorecard system 200 may collect the information by accessing a feed of the information provided to the scorecard system 200 by a third party which monitors Internet traffic entering and leaving an entity's network, such as an Internet service provider (ISP).

The scorecard system 200 may utilize a variety of technologies to implement the security signal collection module 210 and collect the data associated with an entity. For example, the scorecard system 200 may utilize malware sinkhole technologies, in which the scorecard system 200 performs automated nameserver takeovers of domain names that are acting as Command and Control (C2) centers for botnet activity to collect, aggregate, and analyze IP addresses infected with malware. As another example, the scorecard system 200 may utilize network attack honeypot technologies, in which automated network infrastructure honeypots are deployed in multiple locations with the goal of collecting, aggregating, and analyzing IP addresses that are engaged in active attacks against network services, such as SSH brute forcing. In addition, the scorecard system 200 may utilize web application honeypot technologies, in which automated web application honeypots are deployed in multiple locations with the goal of collecting, aggregating, and analyzing IP addresses that are engaged in active attacks against network services, such as SQL injection attempts. The scorecard system 200 can also utilize URL shortener honeypot technologies, in which URL shorteners are deployed throughout the public internet in order to track browsers and operating systems of those who click the links and calculate an endpoint security score. URL shorteners can also be spread among the spam and malware communities as a way to get malicious actors to input links to malicious sources, allowing early identification and mitigation. The scorecard system 200 can also utilize data breach detection and chatter analysis technologies, in which crawlers are used to continuously monitor websites, chat rooms, and social networks for discussions relating to the disclosure of a data breach archive. One of skill in the art will readily recognize that other technology can be used to implement the security signal collection module 210, and the scorecard system 200 in general, without departing in spirit or scope from this disclosure so long as the technology supports the operations described herein.

The scorecard system 200 can also utilize hardware-based sensor technology to augment the data found from external sources. For example, the scorecard system 200 may utilize hardware devices that sit inside an entity's network or in the entity's demilitarized zone (DMZ) to monitor network traffic and identify suspicious traffic that may indicate security issues. The hardware-based sensors may verify that network access controls are configured properly and that network information provided in Assessment Questionnaires were correct. A hardware-based sensor may identify anomalous traffic, software versions used within an entity, browser/operating systems in use, administrative rights propagation, presence of network traffic encryption, access to critical production systems, and the like.

Scorecard system 200 processes the collected data using contextualization and attribution module 220, which includes submodules for extraction 222, normalization 224, weighting 226, and machine learning 228. Contextualization includes extracting, from the collected information, security information indicative of a level of cybersecurity. For example, the scorecard system 200 may use extraction module 222 to perform the extraction. Based on analysis of the extracted security information indicative of a level of security, a security score can be calculated for each of the different types of collected information. For example, a preliminary security score can be calculated for the hacker site information based on analysis of security information extracted from the collected hacker site information, and a separate preliminary security score can be calculated for the application vulnerability information based on analysis of the security information extracted from the collected application vulnerability information.

The factors that influence the preliminary security scoring of raw data to contextualize the data may vary based on the type of data. However, a common factor that influences a preliminary security score is the amount of information identified as harmful to security. For example, in one embodiment, an increase in the amount of leaked credentials may result in a worsening (or rising) of the security score for the leaked credentials information. Similar logic can be applied to each of the different types of data to determine a preliminary security score for the different types of data. In another embodiment, the scorecard system 200 may analyze the number of malware infections to predict breaches. For example, when then number of malware infections detected by the scorecard system 200 has increased, the scorecard system 200 may associate a worse security score with extracted malware infection data because an increase in the number of the malware infections can be a precursor to a security breach. Accordingly, the scorecard system 200 is able to provide more detailed security information for an entity by providing individual security scores for different types of data (drill-down capability) in addition to an overall cybersecurity risk score.

Another factor that the scorecard system 200 may use to contextualize collected data can be the time span between the time when a harmful event occurred and the time when the entity cured the event. For example, when the scorecard system 200 collects data regarding a malware event detected on an IP associated with an entity, the scorecard system 200 can also determine when the malware was removed. When the amount of time an entity takes to react too long, the entity may receive a worse security score for that data. In contrast, when the amount of time an entity takes to react is short, the entity may receive a better security score for that data. In some embodiments, the impact that reaction time has on the security score for a type of data can also be dependent on the industry. For example, the reaction time for curing a malware event can be compared to the reaction time that other companies in the same industry take to cure a malware event. If the entity whose security score is being determined has a reaction time faster than the other companies in the industry, the entity's score for that type of data can be strengthened. In contrast, if the entity's reaction is slower than the reaction time of other companies in the industry, the entity's score for that type of data can be worsened.

The reaction speed can be determined for a plurality of the different types of data in similar manner as discussed herein with respect to malware events. For example, the scorecard system 200 can also determine the entity's reaction time to patch insecure systems or outdated software. One of skill in the art would readily recognize that many of the different types of data collected for an entity can be associated with a reaction speed to address the event that created cybersecurity risk data without departing from this disclosure in spirit or scope.

According to some embodiments, contextualization includes normalizing the security score calculated for a type of collected data to account for different factors that may skew the overall security score. For example, the scorecard system 200 may use normalization module 224 to normalize one or more of the calculated security scores. In some embodiments, the one or more calculated security scores can be normalized based on the size of the entity for which the information was collected. According to one embodiment, normalization includes dividing the calculated score by the number of IPs discovered for an entity, the number of employees in the entity, and/or the revenue of the entity. In another embodiment, normalization includes analyzing the distribution of the number of IPs and creating a normalizing algorithm that normalizes the calculated score to smooth the distribution. In yet another embodiment, normalization includes analyzing the distribution of IPs and creating buckets to divide into the number of open ports.

Different normalization routines can also be applied based on the type of data collected. For example, depending on whether the collected type of data provides IP information, information about employees, or information about technology used by the entity, the optimal normalization scheme may vary. One of skill in the art will readily recognize that although specific normalization schemes have been disclosed, other factors can be used to normalize the calculated score without departing from this disclosure in spirit or scope.

According to some embodiments, contextualization also includes weighing the calculated scores to improve the accuracy of the calculated score. For example, the scorecard system 200 may use weighting module 226 to weigh one or more of the calculated security scores. For example, calculated security scores can be assigned weights based on a correlation between the extracted security information and its impact on the overall cybersecurity risk of an entity. The correlation used to determine the weights can be identified from analysis of one or more previously-breached entities in the same industry as the entity for which a security score is being evaluated. For example, from analysis of the one or more previously-breached entities, a model can be developed which identifies which factors, such as which types of data, were more likely the cause of the breach than others. Based on the determination of which factors cause a greater cybersecurity risk, weights can be assigned to each of the factors. Therefore, the scorecard system 200 may assign similar weights to calculated security scores for different types of data to improve the accuracy of a calculated overall total cybersecurity risk score.

In other embodiments, contextualization, for example via contextualization and attribution module 220, also includes weighing the calculated security scores based on temporal information contained in the collected data. For example, a time range, such as between X and Y, can be defined for one type of data such that collected data can be processed to calculate a security score only if the extracted security information can be attributed between the time range. As one example, and not a limitation, extracted security information may indicate a date for a detected spam event or application vulnerability. If the date of the spam event or application vulnerability detection is outside the range between X and Y, then the security information can be discarded and not processed for the calculation of security scores.

A decay can also be specified for a type of data such that as time passes the significance of the information diminishes. For example, a decay for one type of information may specify that the weight assigned to a particular type of security information can be reduced each month by Z %. In general, the temporal weighing scheme applied to different types of data can be the same or can be different, and one of skill in the art will readily recognize that other weighting schemes can be applied to modify a calculated security score without departing from this disclosure in spirit or scope.

Scorecard system 200 may utilize the benchmarking module 230 to further process the calculated individual scores for each type of data, which may incorporate any normalization or weights assigned to the calculated scores, to calculate an overall cybersecurity risk score for an entity. In other words, the scorecard system 200 can employ benchmarking module 230 to calculate a cybersecurity risk score for the entity based on data collected from the one or more data sources using security signal collection module 210 and processed with contextualization module 220. The overall cybersecurity risk score can be a numeric score, a letter score, and/or a percentile ranking score based on an entity's cybersecurity performance relative to other companies in the same industry. Accordingly, benchmarking module 230 includes a scoring submodule 232 to calculate numeric and/or letter scores for an entity and a percentiles submodule 234 to calculate a percentile ranking score for an entity.

Because the scores generated by the benchmarking module 230 may provide an indication of an entity's cybersecurity performance relative to other companies in the same industry, the scorecard system 200 may create a benchmark percentile reference for an industry. The benchmark percentile reference can be used by the scorecard system 200 during contextualization 220, such as to perform weighting 226, and/or benchmarking 230, such as to obtain a percentile ranking score 234. To create the benchmark percentile reference for an industry, the scorecard system 200 may select a benchmark group of companies to represent an industry. For each of the companies in the benchmark group, the scorecard system 200 may calculate a normalized overall cybersecurity risk score in addition to normalized security scores for each of the different types of data that impacts overall cybersecurity. The scorecard system 200 can compare the scores for all the companies in the benchmark group to rank each of the scores and to establish the benchmark percentile reference to which to compare security scores calculated for companies by the scorecard system 200. According to some embodiments, the scorecard system 200 may employ gradient boosting weighting or another similar machine learning epidemiological algorithm or model to establish the benchmark percentile reference with precision analytics. The scorecard system 200 may utilize the determined benchmark percentile reference during contextualization 220, for example to weight security scores with the weighting submodule 226. Additionally, the scorecard system 200 may utilize the determined benchmark percentile reference during benchmarking 230, for example to determine an entity's percentile ranking score. Therefore, in some embodiments, the scorecard system can classify an entity's calculated cybersecurity risk score according to cyber cybersecurity risk scores calculated for the entity's competitors.

Accordingly, when the scorecard system 200 has been activated to calculate an entity's cybersecurity risk, as part of the processing of the entity's calculated security scores to calculate the overall cybersecurity risk score for the entity, the scorecard system 200 may use the percentiles submodule 234 of benchmarking module 230 to cross-reference each of the security scores to the benchmark percentile reference established for that industry to determine the entity's cybersecurity posture with respect to its peers. In other words, the scorecard system 200 may determine an industry cybersecurity percentile ranking for the entity based on the benchmarking of the calculated overall cybersecurity risk score against one or more cybersecurity risk scores for one or more other entities in the same industry as the entity. The scorecard system 200 may determine an entity's overall percentile ranking as well as the percentile rankings for each of the different types of data collected for the entity.

In some embodiments, the letter score determined for an entity to represent its cybersecurity performance relative to other companies in the same industry, such as a letter score determined using scoring module 232 of the benchmarking module 230, can be a letter score corresponding to the percentile ranking score for an entity. In other words, the scorecard system 200 may determine an overall cybersecurity letter score for the entity based on the entity's percentile ranking. The scorecard system 200 can also determine cybersecurity letter scores for each of the different types of data collected to determine the entity's cybersecurity risk based on the percentile ranking score for each of the different types of data.

In some embodiments, the scorecard system 200 can also calculate confidence levels throughout its operation. For example, the scorecard system 200 may determine a confidence level for a type of data collected by the security signal collection module 210, a confidence level for processes performed with the contextualization and attribution module 220, and/or a confidence level for the overall cybersecurity risk scores and percentiles calculated with the benchmarking module 230. A confidence level may provide an indication of the level of reliability of the data associated with the confidence level. In addition, the confidence level may trigger different actions based on the data associated with the confidence level.

As one example of the utilization of confidence levels throughout the scorecard system's 200 operation, the scorecard system 200 may calculate a confidence level while performing security signal collection 210 to provide a level of reliability for the collected data. For example, the scorecard system 200 may associate a high confidence level with a malware event associated with an IP within the range of IPs determined to be associated with an entity using IP mapping module 213. In contrast, the scorecard system may associate a low confidence level with a malware event not associated with an IP within the range of IPs determined to be associated with an entity using IP mapping module 213. In some embodiments, when data is associated with a low confidence level it can be assigned little weight during contextualization 220 or may indicate that further data for the event should be collected to increase the confidence level.

As another example of the utilization of confidence levels throughout the scorecard system's 200 operation, the scorecard system 200 may calculate a confidence level while performing contextualization 220 to provide a level of reliability for the different processes performed to contextualize the collected data. For example, the scorecard system 200 may associate a high confidence level with a normalized result calculated with normalization module 224 when the entity's size is above a predefined size threshold. In contrast, the scorecard system may associate a low confidence level with a normalized result calculated with normalization module 224 when the entity's size is below a predefined size threshold. In some embodiments, further processing can be performed or further data can be collected to increase the confidence level of the data's contextualization.

As yet another example of the utilization of confidence levels throughout the scorecard system's 200 operation, the scorecard system 200 may calculate a confidence level while performing benchmarking 230 to provide a level of reliability for the overall cybersecurity risk score calculated for an entity. For example, the scorecard system 200 may associate a high confidence level with an overall cybersecurity risk score calculated with benchmarking module 230 when the data relied upon and the contextualization processes performed are each associated with low confidence levels. In contrast, the scorecard system may associate a low confidence level with an overall cybersecurity risk score calculated with benchmarking module 230 when the data relied upon and the contextualization processes performed are each associated with high confidence levels. For example, in one embodiment, little data relevant to security can be obtained for a small company. As a result, the final calculated overall cybersecurity risk score can be associated with a low confidence level. In some embodiments, the low confidence level may trigger intrusive collection of data for an entity. By intrusively collecting data processing the intrusively collected data in collaboration with the non-intrusively collected data, a calculated final overall cybersecurity risk score can be associated with a higher confidence level, which results in a more accurate score for an entity.

In some embodiments, scorecard system 200 may utilize Cubit scoring throughout contextualization 220 and benchmarking 230. Cubit scoring may correspond to an algorithm that examines an array of vectors for critical and high risk security vulnerabilities. Vulnerabilities may have high exploitability and may cause significant harm to the confidentiality, integrity, and availability of digital enterprise resources. Accordingly, scorecard system 200 may track trending vulnerabilities that impact the entire ecosystem of the Internet as they are identified. Examples of tracked vulnerabilities include Heartbleed SSL, POODLE SSL, Shellshock Bash, and FREAK SSL vulnerabilities, to name a few. The scorecard system 200 can also integrate information about new vulnerabilities as soon as the information becomes known. The scorecard system 200, as part of implementing Cubit scoring while performing scoring with benchmarking module 230, may assign points for each data item that is deemed vulnerable, and then associate weighted averages across all data points based on confidence. The scorecard system 200 may then add up the weighted score to obtain a score for a particular data item. The scorecard system can also utilize cubit scoring functionality while executing percentile module 234 by attributing points for data items deemed vulnerable, and then rank the score against the benchmark companies to get a percentile and letter grade for an entity. In some embodiments, cubit scoring comprises analysis of subdomains to identify internal and administrative portals, analysis of WHOIS information to map out contact person and IP addresses ranges of an entity, analysis of CDN information to determine routing information, and analysis of corporate privacy policies listed on public website to identify data handling and data sharing policies.

After the scorecard system 200 has calculated an overall cybersecurity risk score for an entity, the scorecard system 200 may generate an output through which the results can be presented. For example, FIGS. 7-11 illustrate different outputting embodiments through which the results of the scorecard system's analysis of an entity's cybersecurity risk can be displayed. The outputs may provide a summary of the entity's cybersecurity posture as well as provide recommendations and guidance to improve its cybersecurity posture. For example, the scorecard system 200 may transmit the calculated cybersecurity risk score and an identification of one or more objectives to complete to improve the entity's cybersecurity risk score.

In some embodiments, the scorecard system 200 can also receive, for example via cybersecurity risk assessment portal 160, an indication that the one or more objectives have been achieved. After the scorecard system 200 receives the indication that the one or more objectives have been achieved, the scorecard system 200 can calculate an updated cybersecurity risk score for the entity based on data collected from the one or more data sources and the achieved one or more objectives. The scorecard system 200 may also transmit, via the cybersecurity risk assessment portal, the updated calculated risk score.

The scorecard system 200 can also generate alerts to trigger further attention to by a security administrator. For example, the scorecard system 200 may monitor the one or more data associated with an entity in real time. In addition, the scorecard system 200 may have a cybersecurity threshold set for the entity. The cybersecurity threshold can be set by a user of the scorecard system 200 or can be dynamically calculated based on processing performed by the scorecard system. When the scorecard system 200 detects that the overall cybersecurity risk score exceeds the cybersecurity threshold, the scorecard system 200 may generate an alert which can be transmitted to a representative of the entity or simply displayed an output, for example on a user interface or output display, such as the output displays illustrated in FIGS. 7-11.

Figure 3:
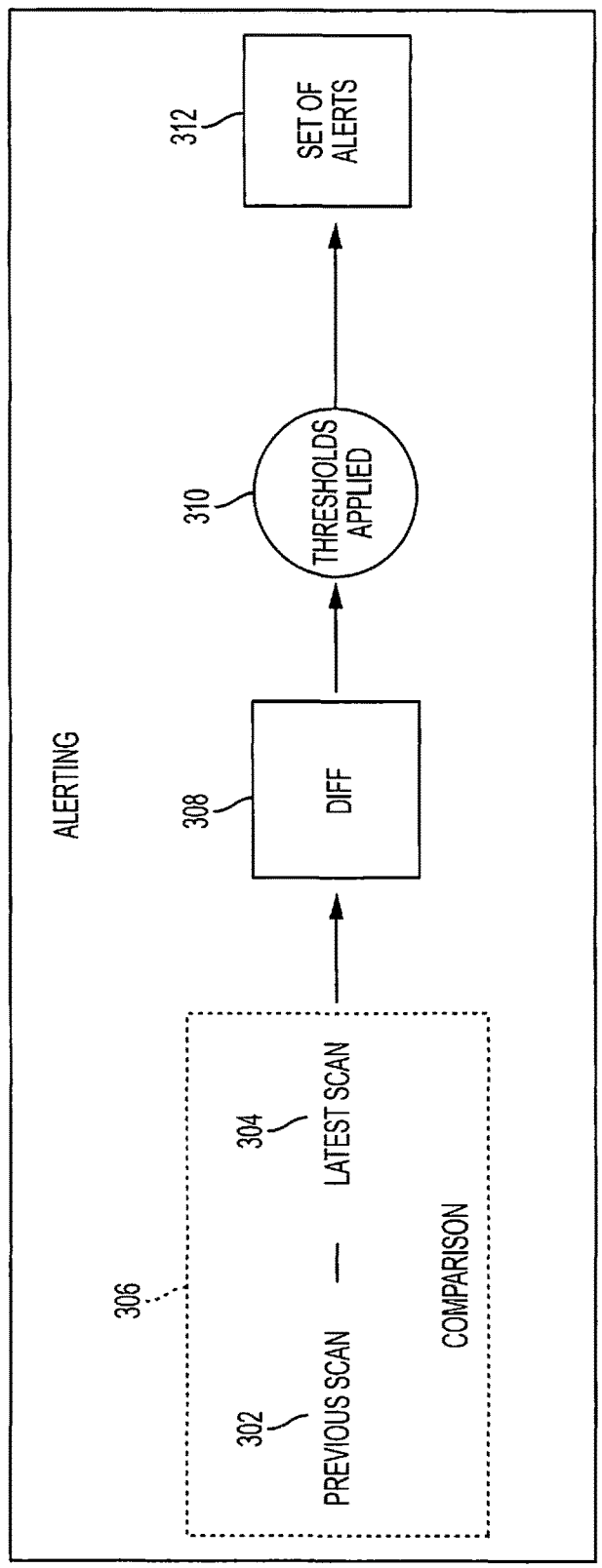
FIG. 3 is a flow diagram of alerts generated by a system for calculating and benchmarking an entity's cybersecurity risk according to an embodiment.

FIG. 3 is a block diagram of alerts generated by a scorecard system according to an embodiment. At block 302, the scorecard system 200 obtains a previous score for an entity. The score can be a preliminary security score, a normalized and/or weighted score, or an overall cybersecurity risk score. At block 304, the scorecard system 200 obtains a new score for the entity. At block 306, the scorecard system 200 compares the new score and the previous score to determine a difference 308. For example, the scorecard system 200 may utilize benchmarking module 230 to compare an entity's calculated cybersecurity risk score to at least one historical cybersecurity score previously calculated for the entity. In some embodiments, the scorecard system 200 may transmit, for example via the cybersecurity risk assessment portal 160, trend information based on the comparison.

At block 310, the scorecard system 200 compares the difference 308 to a cybersecurity difference threshold. The cybersecurity difference threshold can be set by a user of the scorecard system 200 or can be dynamically calculated based on processing performed by the scorecard system. When the scorecard system 200 detects that the difference 308 in overall cybersecurity risk score exceeds the cybersecurity difference threshold, the scorecard system 200 may generate an alert at block 312. In some embodiments, an alert comprises a user interface alert notification. In another embodiment, an alert comprises a real-time e-mail.

In some embodiments, rather than comparing the new calculated cybersecurity risk score for the entity to a previous score, new scores can be analyzed against the threshold without being compared to a previous score. For example, in some embodiments, the scorecard system 200 can calculate, for example on a periodic basis, updated cybersecurity risk scores for the entity based on data collected from the one or more data sources. The scorecard system 200 can then compare one or more of the updated cybersecurity risk scores to a threshold. In some embodiments, if the one or more updated cybersecurity risk scores is below the threshold, the scorecard system 200 can transmit, via the cybersecurity risk assessment portal, an alert. According to another embodiment, if the one or more updated cybersecurity risk scores are below the threshold, the scorecard system 200 can transmit, via the cybersecurity risk assessment portal, the one or more cybersecurity risk scores and an identification of one or more updated objectives to complete to improve the entity's cybersecurity risk score.

Figure 4:
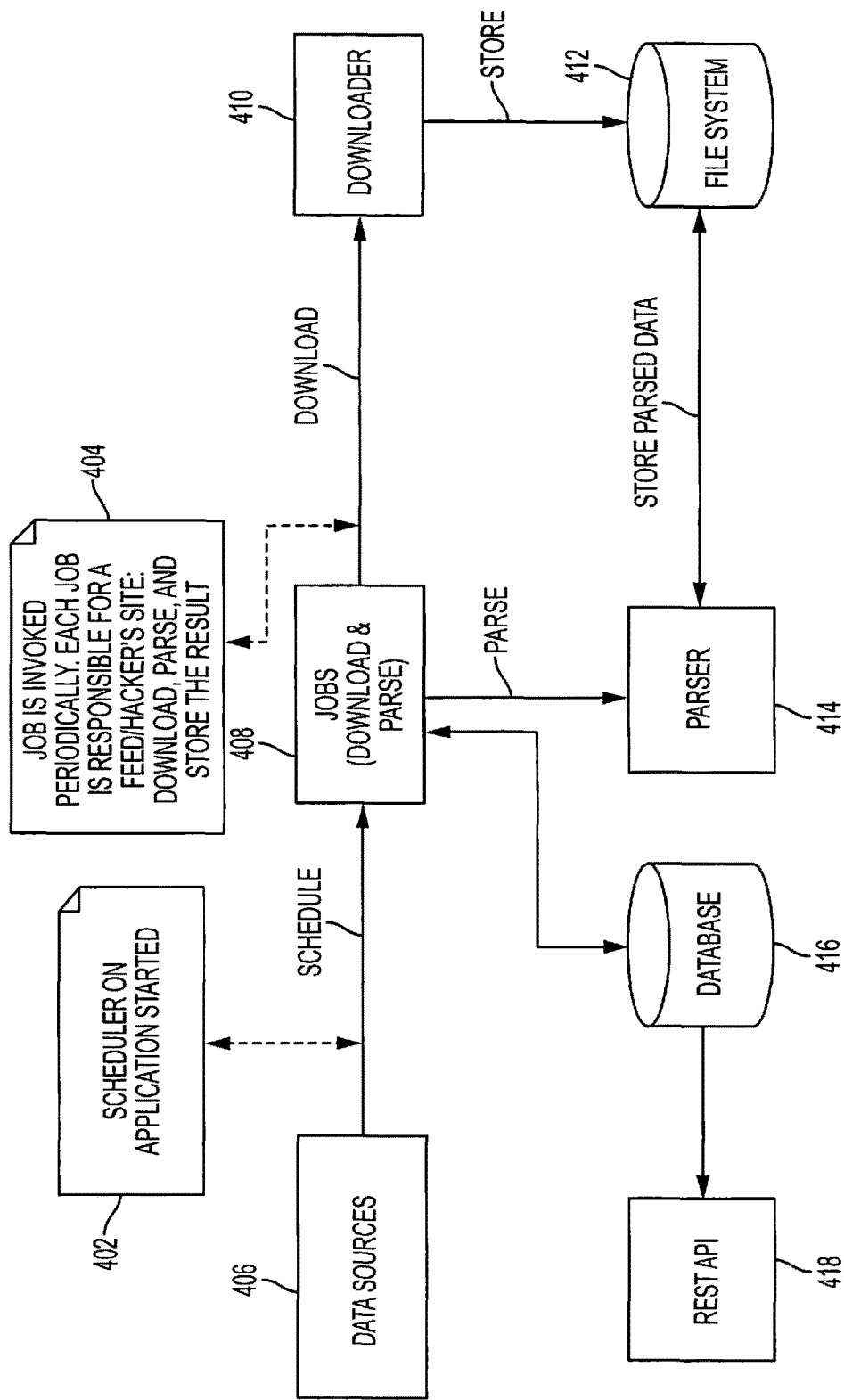
FIG. 4 is a block diagram of a system for calculating and benchmarking an entity's cybersecurity risk according to an embodiment.

FIG. 4 is a flow chart of scheduling functions performed by the scorecard system 200 according to an embodiment. At block 402, a scheduler on an application can be started. For example, the scheduler can be started after a user enters a URL for an entity for which a security score is desired, which may initiate scorecard system 200. At block 404, a job can be invoked periodically, wherein each job can be responsible for downloading, parsing, and storing data, such as at block 408, from data sources 406. Each job may download, parse, and store data collected from a security signal collection feed, such as, for example, a hacker forum site. For example, during a job, the scorecard system 200 may execute security signal collection module 210 to collect data and contextualization and attribution module 220 to process the collected data. In some embodiments, a downloader 410 may download data collected during a job to a file system 412 for storage purposes. In addition, a parser 414 may parse data collected during the job and store the parsed data in the file system 412. In some embodiments, the scorecard system may execute the parser while executing extraction module 222. In some embodiments, data can also be stored in a database 416 accessed by a Representational State Transfer (REST) Application Program Interface (API) 418, which can be used implement the scorecard system 200 on a scorecard system, such as scorecard server 110.

Figure 5:
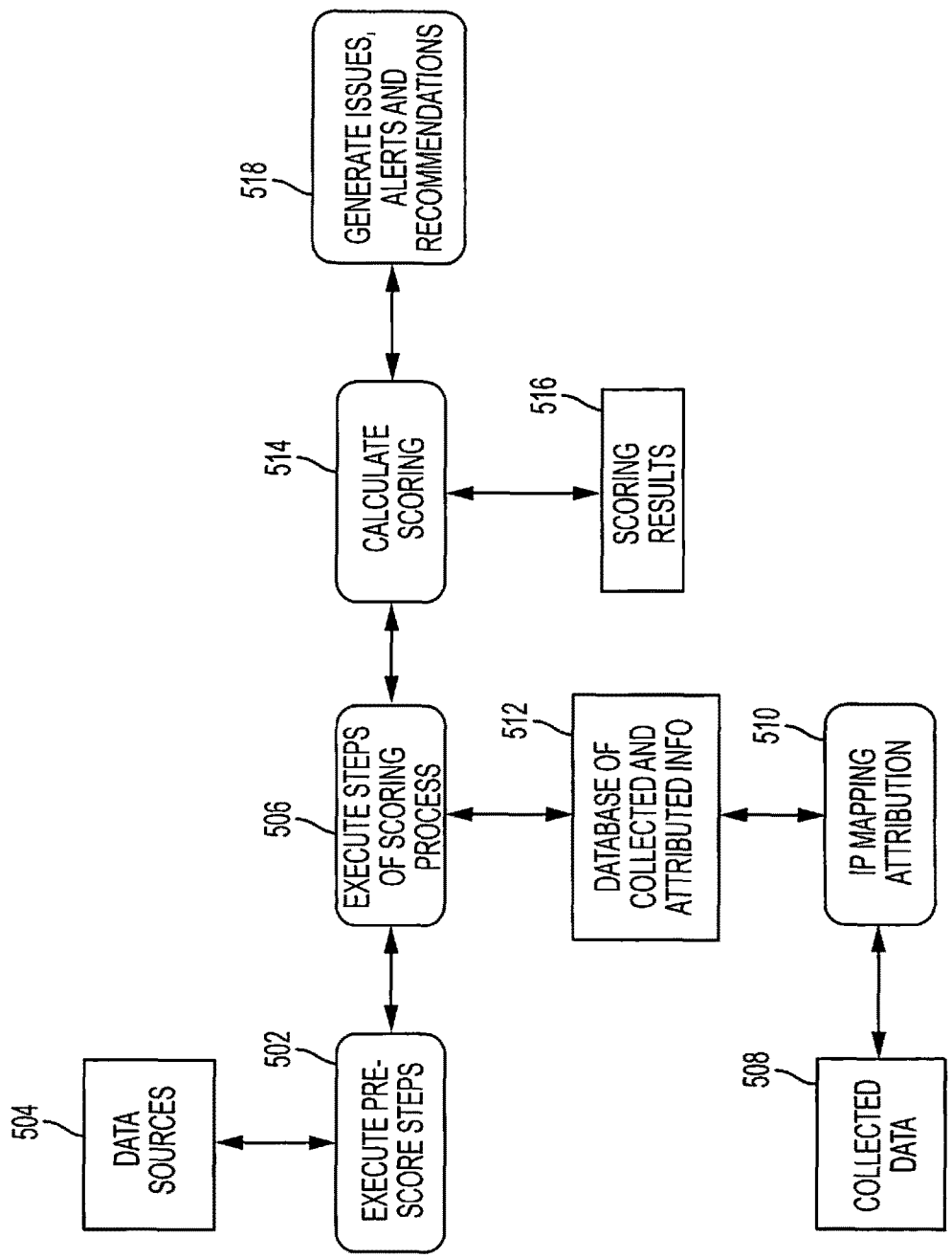
FIG. 5 is a flow diagram of functions performed by a system for calculating and benchmarking an entity's cybersecurity risk according to an embodiment.

FIG. 5 is a flow chart of steps performed by a system such as scorecard system 200 according to an embodiment. At block 502, scorecard system 200 may execute pre-score steps, which comprises collecting data associated with an entity via security signal collection module 210. The data can be collected from data sources 504, such as data sources 150 illustrated in FIG. 1. At block 506, scorecard system 506 comprises executing the scoring process, which comprises executing the contextualization process 220 of scorecard system 200. For example, data collected using security signal collection module 210, such as collected data 508, can be contextualized/attributed with respect to an entity using an IP mapping 510 created for the entity. The contextualization/attribution comprises determining whether the collected data is associated with an IP within the range of IPs associated with the entity via IP mapping. Data determined to be associated with an IP within the range of IPs associated with an entity can be attributed to the entity, stored in a database 512 of collected and attributed data for the entity, and contextualized with respect to the entity at block 506. At block 514, scorecard system 200 may use benchmarking module 230 to calculate an overall cybersecurity risk score for an entity. The scoring results can be output at block 516. In some embodiments, the scorecard system 200 may generate alerts, issues, and recommendations for an entity at block 518.

In some embodiments, the calculated cybersecurity risk score, either numeric, letter, or percentile, can be used by cyber insurance providers to determine premiums for companies. In other words, the scorecard system 200 can be used as a cybersecurity insurance underwriting system. For example, historical cybersecurity performance scores calculated using scorecard system 200 can be used by a cyber-insurance provider to assess the risk of an entity being breached. The cyber insurance provider may then adjust premiums based on the assessment of an entity's probability of experiencing a security breach.

In some embodiments, the scorecard system 200 can be collaboratively accessed by business partners. For example, a business may access the scorecard system 200 to obtain a cybersecurity risk score for a business partner's company, such as a vendor's company. After the score is calculated, the scorecard system may inform the business partner of their company's security score and provide actionable items that the entity can take to improve their score. For example, in one embodiment, the scorecard system 200 may send the business partner a one-time URL through which the business partner may login to the scorecard system and access its score and view its recommended action items to improve its score. Allowing access to both a business and a business partner may allow them to collaborate together to improve the business partner's security score. The business that originally requested the cybersecurity risk score for the business comprises comments to the business partner's scorecard. In addition, the original business can also be notified when the business partner addresses action items to improve its score.

In some embodiments, the scorecard system 200 can also map non-intrusively collected data for an entity to the entity's risk management questionnaire to determine a level of reliability of the questionnaire. In other words, the non-intrusively collected data can be used to confirm whether the answers in the questionnaire have been answered properly. For example, if an entity indicates in a questionnaire that they have a robust Application Security program, yet the non-intrusively collected data indicates that the application's security is below, for example, the $50^{th}$ percentile, then the entity's risk questionnaire can be discredited.

In some embodiments, multiple companies can be grouped together, for example, as an industry, by the scorecard system 200 and the scorecard system 200 may calculate a security score for the group by averaging the individual scores for each of the companies in the group. Accordingly, the scorecard system 200 may calculate a security score for an industry and provide an indication of how one industry compares to another with respect to cybersecurity. For example, in some embodiments, the scorecard system can store, in non-transitory memory, a set of attributes for each a plurality of entities. According to an embodiment, the set of attributes may comprise at least an identity of the plurality of entities. The set of attributes can also comprise at least one of the number of employees of the entity, the industry in which the entity operates, and an identification of one or more of the entity's competitors. The scorecard system 200 can identify requisite attributes of the one or more attributes, where entities having the requisite attributes are identified as belonging to a group. In some embodiments, the scorecard system 200 can calculate an individual cybersecurity risk score for each of the plurality of entities in the group entity based, at least in part, on the set of attributes stored for each of plurality of entities in the group. The scorecard system 200 may also generate, based on the calculated individual cybersecurity risk scores, a composite cybersecurity risk score for the group.

In some embodiments, the scorecard system 200 can transmit an indication of relative cybersecurity risk score of one or more entities, the relative cybersecurity risk score based on a comparison of the individual cybersecurity risk score of the one or more entities to the composite cybersecurity risk score of the group. In another embodiment, the scorecard system 200 can transmit, to one or more entities in the group, an identification of one or more objectives to complete to improve the entity's relative cybersecurity risk score. The scorecard system 200 can also receive an indication that the objective has been achieved, calculate an updated relative cybersecurity risk score for the one or more entities based on the stored attributes and the achieved objective, and transmit an indication of the updated relative cybersecurity risk score of one or more entities.

In some embodiments, the scorecard system 200 can also monitor the relative cybersecurity risk performance for each entity in the group. When the relative cybersecurity risk score for one or more entities in the group decreases, the scorecard system 200 may transmit an alert to the one or more entities whose relative cybersecurity risk score decreased. In another embodiment, when the relative cybersecurity risk score for one or more entities in the group decreases, the scorecard system 200 can transmit an identification of one or more updated objectives to complete to improve the entity's relative cybersecurity risk score to the one or more entities whose relative cybersecurity risk score decreased.

In view of exemplary systems shown and described herein, methodologies that can be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks can be required to implement methodologies described herein. It is to be appreciated that functionality associated with blocks can be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
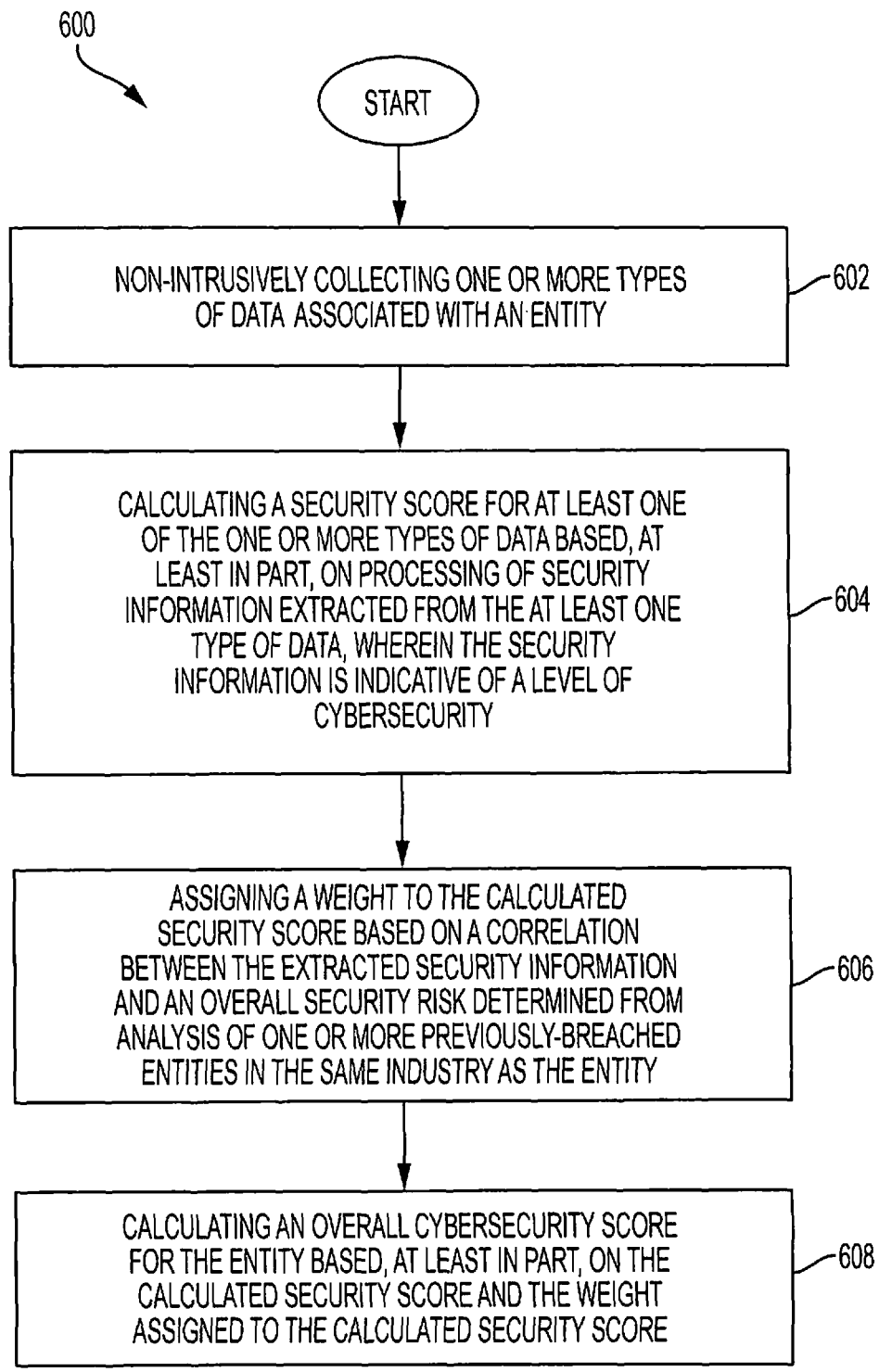
FIG. 6 is a flow diagram of a method for calculating and benchmarking an entity's cybersecurity risk according to an embodiment.

FIG. 6 is a flow chart of a method for determining an entity's cybersecurity risk according to an embodiment. It is noted that embodiments of method 600 can be implemented with the systems described with respect to FIGS. 1-5 and FIG. 12. For example, a processor disclosed in method 600 may correspond to a processor within a scorecard server disclosed in this disclosure. Specifically, method 600 includes, at block 602, non-intrusively collecting, by a processor, one or more types of data associated with an entity. the method can also comprises intrusively collecting a portion of the one or more types of data associated with the entity, wherein the one or more types of data includes the intrusively-collected portion of the one or more types of data. In addition, the one or more types of data includes data associated with social engineering, malware and botnet infections, application vulnerabilities, breach history, network exploits, DNS health, patching cadence, and leaked employee credentials.

At block 604, method 600 includes calculating, by the processor, a security score for at least one of the one or more types of data based, at least in part, on processing of security information extracted from the at least one type of data, wherein the security information is indicative of a level of cybersecurity. At block 606, method 600 includes assigning, by the processor, a weight to the calculated security score based on a correlation between the extracted security information and an overall cybersecurity risk determined from analysis of one or more previously-breached entities in the same industry as the entity. The method can also comprise normalizing the calculated security score for the at least one type of data based, at least in part, on the type of the data and the size of the entity.

At block 608, method 600 includes calculating, by the processor, an overall cybersecurity risk score for the entity based, at least in part, on the calculated security score and the weight assigned to the calculated security score. the method can also comprises determining an industry cybersecurity percentile ranking for the entity based, at least in part, on a benchmarking of the calculated overall cybersecurity risk score against one or more cybersecurity risk scores for one or more other entities in the same industry as the entity.

The method can also comprises generating an alert when the overall cybersecurity risk score exceeds a cybersecurity threshold. In another embodiment, the method can also comprises monitoring the one or more data in real time, wherein the alert is generated based, at least in part, on the real-time monitoring.

The schematic flow chart diagram of FIG. 6 is generally set forth as a logical flow chart diagram. As such, the depicted order and labeled steps are indicative of aspects of the disclosed method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagram, they are understood not to limit the scope of the corresponding method. Indeed, some arrows or other connectors can be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
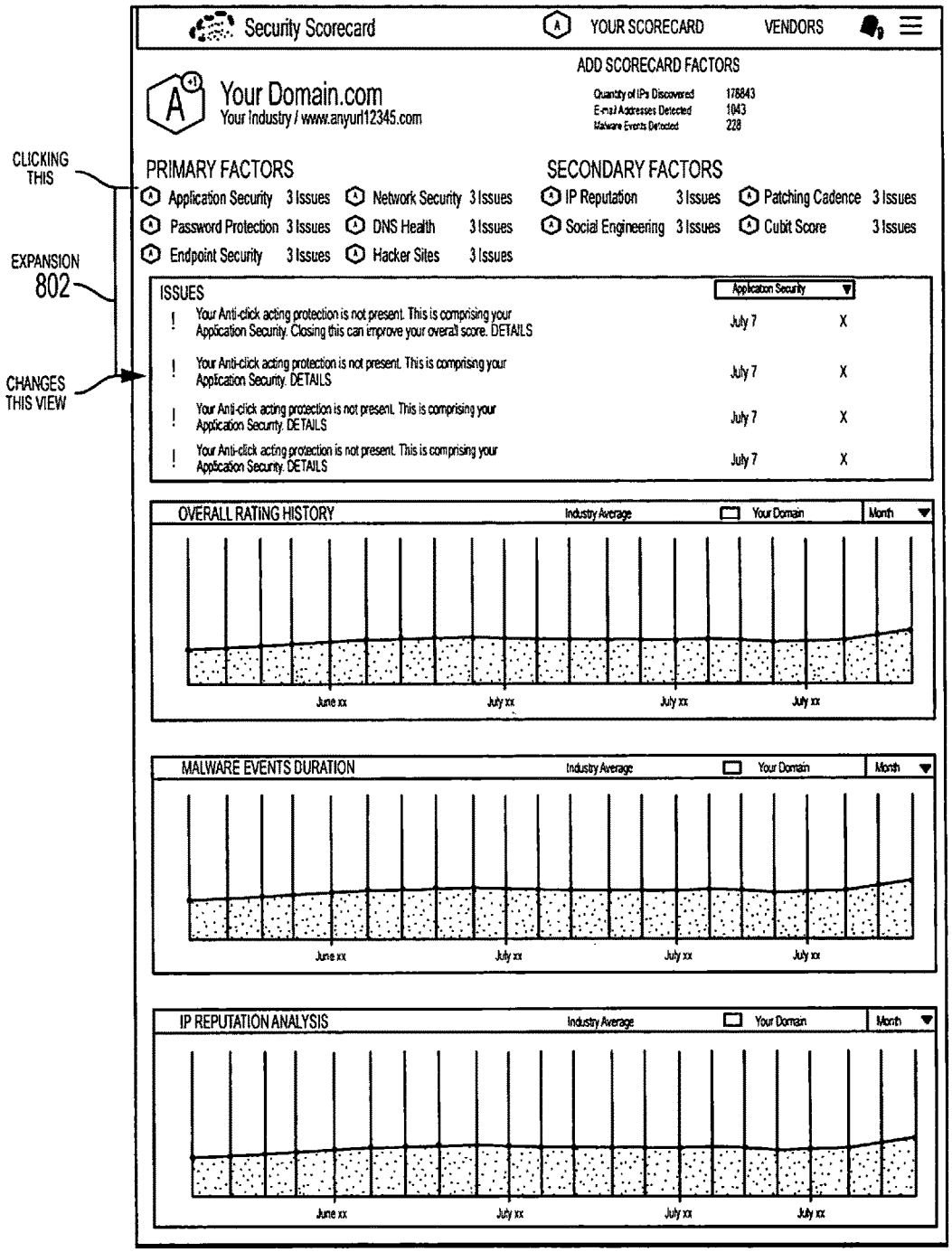
Figure 9:
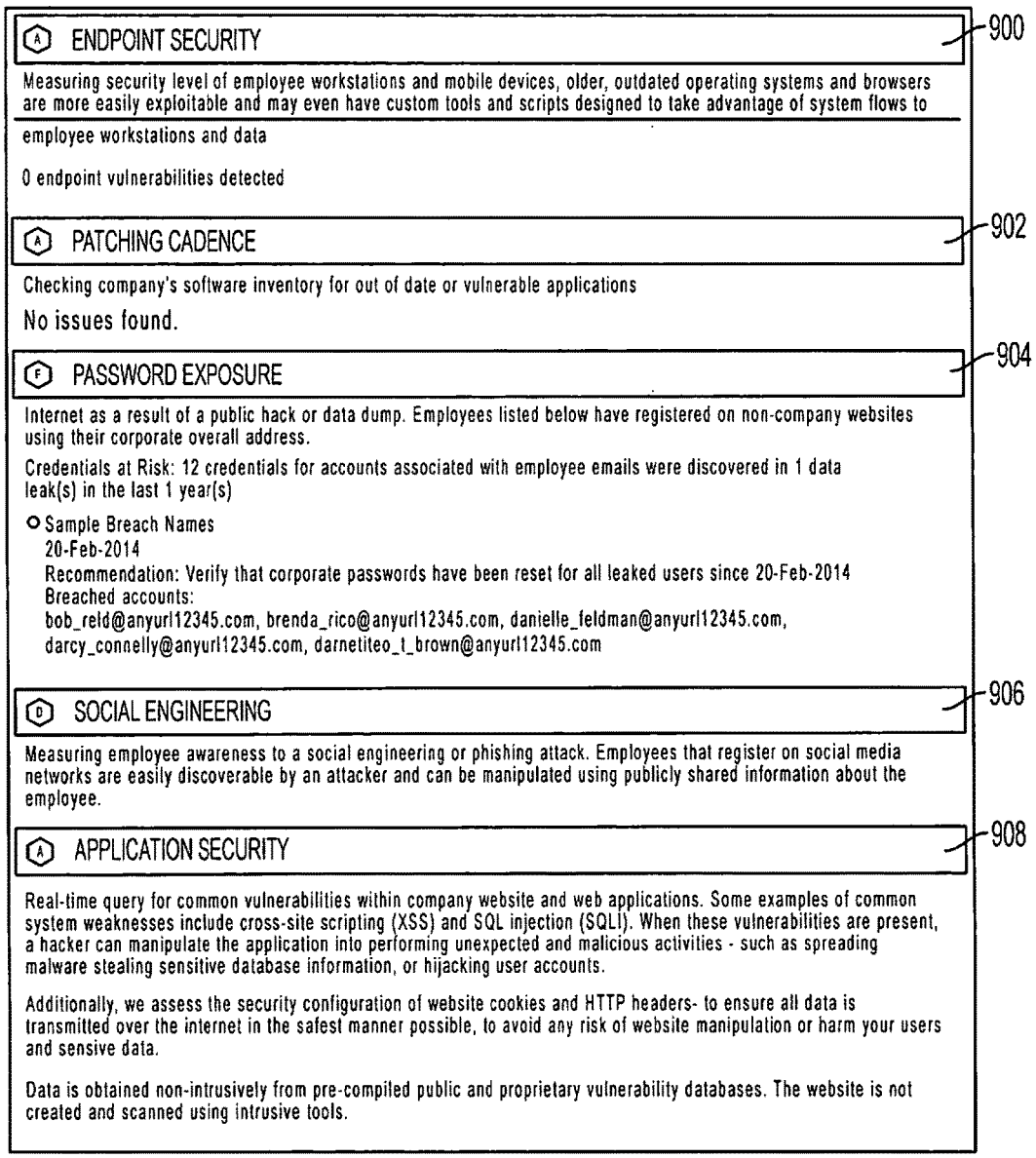
Figure 10:
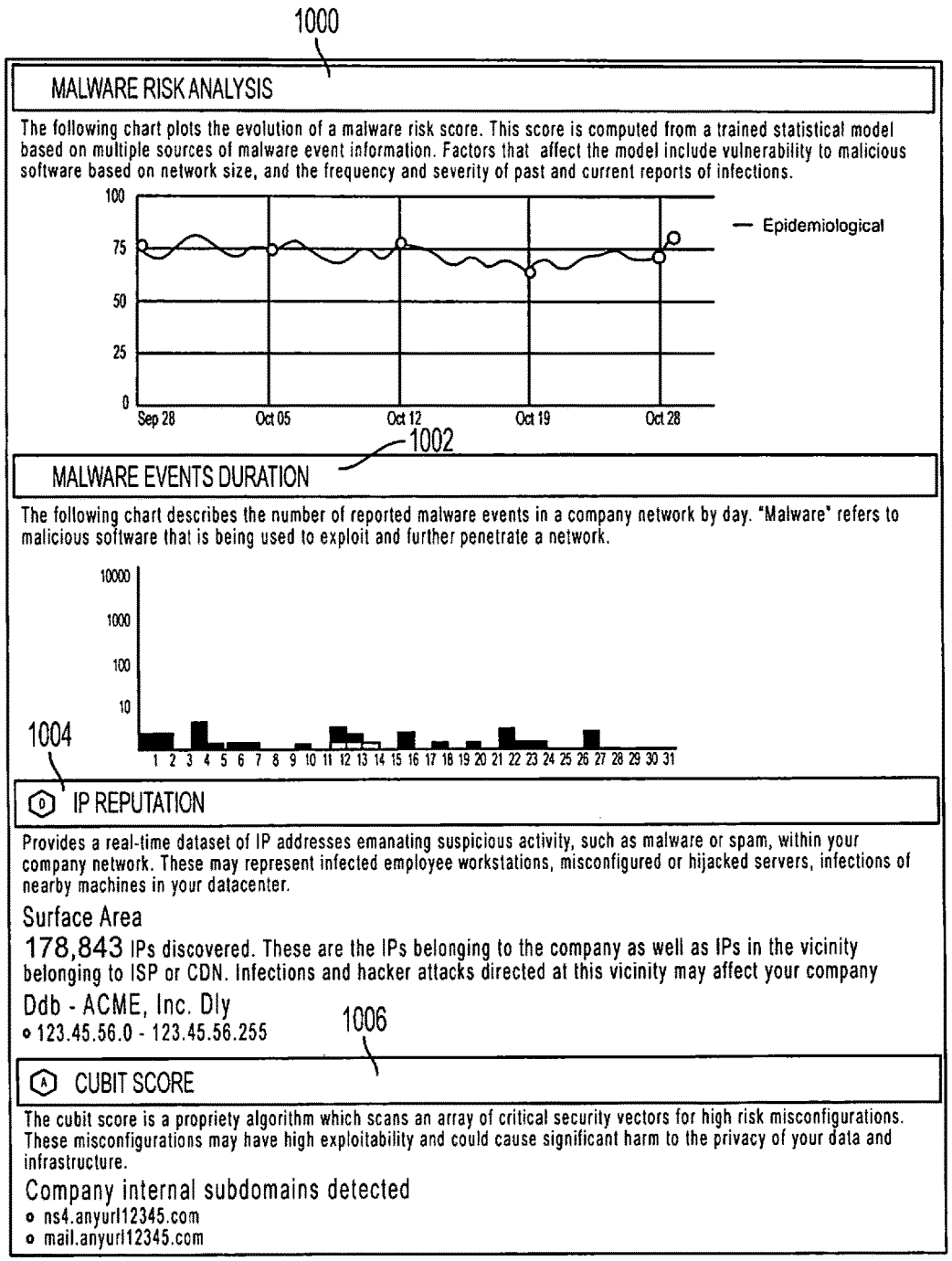

FIG. 7 is one scorecard view used to illustrate some of the information output by a system such as scorecard system 200. The information comprises a scorecard overview 700, a percentile rank for a particular business 702, a number of threat indicators 704, informational indicators 706, an overall rating history 708, and a findings summary 710, according to one embodiment. FIG. 8 is an expansion view 802 that illustrates at least those primary factors of a domain which can expand into a list of issues that might be related to a primary factor being analyzed, according to one embodiment. FIG. 9 is a sample scorecard view that illustrates at least endpoint security 900, patching cadence 902, password exposure 904, social engineering 906, and application security 908, according to one embodiment. FIG. 10 illustrates at least a scorecard view that includes a malware risk analysis 1000, a malware events duration 1002, an IP reputation 1004, and a cubit score 1006, according to one embodiment. FIG. 11 is a scorecard view that illustrates at least network security 1102, hacker sites 1104, and DNS health 1106, according to an embodiment.

If implemented in firmware and/or software, the functions described above can be stored as one or more instructions or code on a computer-readable medium. Examples include non-transitory computer-readable media encoded with a data structure and computer-readable media encoded with a computer program. Computer-readable media includes physical computer storage media. A storage medium can be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data can be provided as signals on transmission media included in a communication apparatus. For example, a communication apparatus includes a transceiver having signals indicative of instructions and data. The instructions and data can be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein can be utilized according to the present disclosure. Accordingly, the appended claims are intended to include within their scope such processes, machines, manufacture, compositions of matter, means, methods, or steps.

The invention claimed is:

1. A method for improving an entity's cybersecurity risk using a cybersecurity risk assessment portal, the method comprising:
   receiving, via a cybersecurity risk assessment portal operating on one or more machines, a request to calculate an entity's cybersecurity risk based, at least in part, on a first set of attributes of the entity, the first set of attributes comprising an industry in which the entity operates and an identification of one or more of the entity's competitors;
   identifying, based on the first set of attributes, one or more data sources from which to collect one or more types of data relating to the entity's cybersecurity risk;
   calculating a cybersecurity risk score for the entity based on data collected from the one or more data sources; and
   transmitting, in response to the request, via the cybersecurity risk assessment portal operating on the one or more machines, the calculated cybersecurity risk score.

2. The method of claim 1 further comprising:
   classifying the calculated cybersecurity risk score according to cyber security risk scores calculated for one or more of the entity's competitors.

3. The method of claim 1 further comprising:

comparing the calculated cybersecurity risk score to at least one historical cybersecurity score previously calculated for the entity; and transmitting, via the cybersecurity risk assessment portal, trend information based on the comparison.

4. The method of claim 1 wherein the cybersecurity risk assessment portal is an online portal.

5. The method of claim 1 further comprising:
transmitting access credentials required to access the cybersecurity risk assessment portal, and
wherein receiving, via a cybersecurity risk assessment portal, a request to calculate an entity's cybersecurity risk is conditioned upon a user providing the access credentials.

6. The method of claim 1 further comprising:
calculating, on a periodic basis, updated cybersecurity risk scores for the entity based on data collected from the one or more data sources;
comparing one or more of the updated cybersecurity risk scores to a threshold; and
if the one or more updated cybersecurity risk scores is below the threshold, transmitting, via the cybersecurity risk assessment portal, an alert.

7. The method of claim 6 further comprising:
if the one or more updated cybersecurity risk scores is below the threshold, transmitting, via the cybersecurity risk assessment portal, the one or more cybersecurity risk scores and an identification of one or more updated objectives to complete to improve the entity's cybersecurity risk score.

8. An apparatus comprising:
a memory; and
a processor coupled to the memory, the processor configured to execute the steps of:
receiving, via a cybersecurity risk assessment portal operating on one or more machines, a request to calculate an entity's cybersecurity risk based, at least in part, on a first set of attributes of the entity, the first set of attributes comprising an industry in which the entity operates and an identification of one or more of the entity's competitors;
identifying, based on the first set of attributes, one or more data sources from which to collect one or more types of data relating to the entity's cybersecurity risk;
calculating a cybersecurity risk score for the entity based on data collected from the one or more data sources; and
transmitting, in response to the request, via the cybersecurity risk assessment portal operating on the one or more machines, the calculated cybersecurity risk score.

9. The apparatus of claim 8 where the processor is further configured to execute the steps of:
transmitting, in response to the request, via the cybersecurity risk assessment portal operating on the one or more machines, an identification of one or more objectives to complete to improve the entity's cybersecurity risk score.

10. The apparatus of claim 9 where the processor is further configured to execute the steps of:
receiving, via the cybersecurity risk assessment portal, an indication that an objective has been achieved;
calculating an updated cybersecurity risk score for the entity based on data collected from the one or more data sources and the achieved objective; and
transmitting, via the cybersecurity risk assessment portal, the calculated updated cybersecurity risk score.

11. The apparatus of claim 8 where the processor is further configured to execute the steps of:
classifying the calculated cybersecurity risk score according to cybersecurity risk scores calculated for one or more of the entity's competitors.

12. The apparatus of claim 8 where the processor is further configured to execute the steps of:
comparing the calculated cybersecurity risk score to at least one historical cybersecurity score previously calculated for the entity; and
transmitting, via the cybersecurity risk assessment portal, trend information based on the comparison.

13. The apparatus of claim 8 wherein the cybersecurity risk assessment portal is an online portal.

14. The apparatus of claim 8 where the processor is further configured to execute the steps of:
transmitting access credentials required to access the cybersecurity risk assessment portal, and
wherein receiving, via a cybersecurity risk assessment portal, a request to calculate an entity's cybersecurity risk is conditioned upon a user providing the access credentials.

15. The apparatus of claim 8 where the processor is further configured to execute the steps of:
calculating, on a periodic basis, updated cybersecurity risk scores for the entity based on data collected from the one or more data sources;
comparing one or more of the updated cybersecurity risk scores to a threshold; and
if the one or more updated cybersecurity risk scores is below the threshold, transmitting, via the cybersecurity risk assessment portal, an alert.

16. The apparatus of claim 15 where the processor is further configured to execute the steps of:
if the one or more updated cybersecurity risk scores is below the threshold, transmitting, via the cybersecurity risk assessment portal, the one or more cybersecurity risk scores and an identification of one or more updated objectives to complete to improve the entity's cybersecurity risk score.

* * * * *